(12) United States Patent
Griffiths et al.

(10) Patent No.: US 6,458,966 B1
(45) Date of Patent: Oct. 1, 2002

(54) DYE INTERMEDIATE AND METHOD

(75) Inventors: John Griffiths; John Mama, both of Leeds; Valerie Millar, Mid Glamorgan; Mark Briggs, Cardiff; Alan Hamilton, Amersham, all of (GB)

(73) Assignee: Nycomed Amersham plc, Amersham (GB)

( * ) Notice: Subject to any disclaimer, the term of this patent is extended or adjusted under 35 U.S.C. 154(b) by 0 days.

(21) Appl. No.: 09/485,177
(22) PCT Filed: Aug. 4, 1998
(86) PCT No.: PCT/GB98/02334
§ 371 (c)(1), (2), (4) Date: Apr. 24, 2000
(87) PCT Pub. No.: WO99/07793
PCT Pub. Date: Feb. 18, 1999

(30) Foreign Application Priority Data

Aug. 4, 1997 (GB) .............................. 9716476

(51) Int. Cl.⁷ .................. C07D 209/04; C07D 215/02; G01N 33/533
(52) U.S. Cl. ........................ 548/511; 435/6; 436/527; 436/546; 530/391.5; 530/409; 546/165; 546/192; 546/208; 546/277.4; 562/41; 562/45; 562/87; 564/287
(58) Field of Search .................. 548/511; 530/391.5, 530/409; 435/6; 436/527, 546; 546/165, 208, 192, 277.4; 562/41, 45, 87; 564/287

(56) References Cited

U.S. PATENT DOCUMENTS

| | | | |
|---|---|---|---|
| 3,617,210 A | 11/1971 | Dehnert et al. | |
| T979,003 I4 | 2/1979 | Jamesion | |
| 4,557,862 A | 12/1985 | Mangel et al. | |
| 4,830,786 A | 5/1989 | Pease et al. | |
| 5,486,616 A | 1/1996 | Waggoner et al. | |

FOREIGN PATENT DOCUMENTS

| | | | |
|---|---|---|---|
| CH | 512 632 A | 9/1971 | |
| GB | 1 393 263 B | 7/1976 | |
| WO | WO87 03589 A | 6/1987 | |
| WO | WO97 29154 A | 8/1997 | |

OTHER PUBLICATIONS

DE 195 30 449 A Feb. 20, 1997 Germany.
EP 0 747 447 Dec. 11, 1996 EPO.
EP 0 314 480 A May 3, 1989 EPO.
WO97 11067 A Mar. 27, 1997 WIPO.
EP 0 582 836 A Feb. 16, 1994 EPO.
FR 2 612 921 A Sep. 30, 1988 France.
GB 2 002 801 A Feb. 28, 1979 Great Britain.
EP 0 275 139 A Jul. 20, 1988 EPO.
WO92 09661 A Jun. 11, 1992 WIPO.
EP 0 214 847 A Mar. 18, 1987 EPO.
DE 39 12 046 A Mar. 15, 1990 Germany.
EP 0 383 092 A Aug. 22, 1990 EPO.
EP 0 414 476 A Feb. 27, 1991 EPO.
GB 1 464 706 Feb. 16, 1977 Great Britain.
GB 1 420 777 Jan. 14, 1976 Great Britain.
GB 1 460 210 Dec. 31, 1976 Great Britain.
GB 2,194,545 Mar. 9, 1988 Great Britain.

*Primary Examiner*—Mary E. Ceperley
(74) *Attorney, Agent, or Firm*—Royal N. Romming, Jr.; Stephen G. Ryan

(57) ABSTRACT

Various classes of dyes are provided having acid, ester or amide groups for covalent linking to biomolecules. The dyes may be prepared by use of a compound of formula (I)

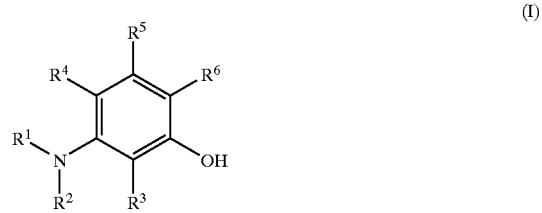

(I)

where $R^1$ comprises a linker and a carboxy including acid, salt, ester including N-hydroxysuccinimide, activated ester or amide group; $R^2$, $R^3$, $R^4$ and $R^5$ are H, $C_1$–$C_{10}$ alkyl or aralkyl or a group to modify solubility or electronic or spectral properties or a functional linking group: or $R^4$–$R^5$ and/or $R^2$–$R^4$ and/or $R^2$–$R^3$ are linked to form an extended ring system; and $R^6$ is H or CHO or NO.

5 Claims, No Drawings

DYE INTERMEDIATE AND METHOD

Dyes have applications in many technologies, both new and well established, which count amongst them textile dyeing, optical data storage media and various detection methods, for both chemical and biological use. Within these applications various properties of the dyes are exploited in their actual detection which may ultimately be traced back to absorption, reflectance and luminescence (chemiluminescence, fluorescence and phosphorescence). However, a recurring theme of many applications is the need to form a relatively permanent link, in the form of a covalent bond, between the dye and the substrate of choice. The substrate may be inter alia: a relatively inert surface or probe possibly of insoluble polymeric origin; a macromolecule of biological origin e.g. a protein, antibody or oligonucleotide; or a small molecule of either biological or synthetic origin e.g. a hapten for use in directed or molecular recognition based applications; or a molecule which may modify the properties of the dye e.g. a water solubilising group such as a carbohydrate or other polar residues; or a species which protects the dyes from or decreases the rate of photofading of the dye, such as hindered amines and various transition metal complexes; or possibly another dye conjugate system thus enabling the possibility of energy transfer or fluorescence quenching based applications. The requirement for a covalent linkage means that many commercial products, spanning a large range of dye classes and possessing the desired spectral properties, cannot be used. This therefore necessitates either the modification of an existing product or the complete synthesis from appropriate materials such that a suitable grouping is available for linking the dye and substrate. There are many different sorts of linkage known, the main requirements being that the linkage is relatively stable and that it is easily introduced in high yield or efficiency. One of the most versatile groupings is that of the carboxylic acid which is readily converted to a range of reactive species or used to form a link to another substance containing the reactive linking species of choice.

This invention is concerned with a relatively simple and easily prepared dye intermediate and its use for preparing a range of dyes particularly fluorescent dyes having reactive groups by which they can be linked to various substrates. The intermediate is a m-aminophenol having the formula (I)

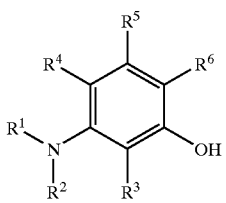

(I)

Where $R^1$ is —$R^a R^b$, where $R^a$ is $C_1$–$C_{10}$ alkylene or aralkylene which may optionally contain 1 to 4 oxygen, nitrogen or sulphur atoms in a straight or branched chain, and $R^b$ is carboxy including acid, is salt, ester including N-hydroxysuccinimide, activated ester or amide, $R^2$, $R^3$, $R^4$ and $R^5$ are the same or different and each is: H; or $C_1$–$C_{10}$ alkyl or aralkyl which may optionally contain 1 to 4 oxygen, nitrogen or sulphur atoms in a straight or branched chain; or $R^c$ where $R^c$ is a group to modify solubility, or a group to modify electronic and/or spectral properties, or a functional linking group; or —$R^a R^c$ wherein $R^a$ and $R^c$ are herein defined, or $R^4$–$R^5$ and/or $R^2$–$R^4$ and/or $R^2$–$R^3$ are linked to form an extended ring system, carbocyclic or heterocyclic, aromatic or aliphatic which is unsubstituted or substituted as above, $R^6$ is H or —$CR^9O$ or N—O.

$R^9$ is H, $C_1$–$C_6$ alkyl phenyl or $R^a R^c$ wherein $R^a$ and $R^c$ are herein defined.

$R^1$ may be different or the same as $R^2$.

$R^2$, $R^3$, $R^4$ and $R^5$ may contain carbon chains which are linked to form extended ring systems, either aliphatic or aromatic, for example

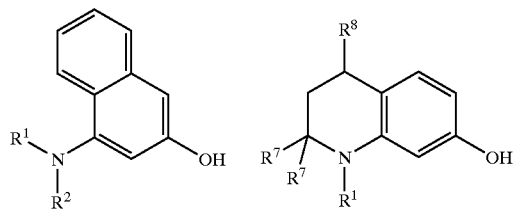

where each of $R^7$ and $R^8$ are defined as $R^2$, $R^3$, $R^4$ and $R^5$.

Many of the dyes described below are made from compounds of formula (I) in which $R^6$ has been changed from H to either formyl or nitroso, for example

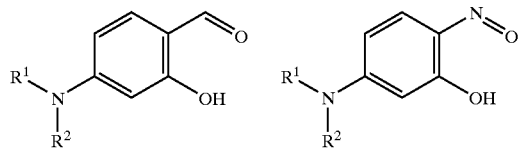

These may be made from the corresponding compounds where $R^6$ is H by standard methods.

Groups to modify solubility include phosphate, sulphonate, carbohydrate, poly(oxyethylene) and perfluoroalkyl. Groups to modify electronic and/or spectral properties include nitro, cyano, halogen and alkoxy. Functional groups for linking to another component include carboxylic acid or derivative or activated ester, azide, amine, hydroxyl, sulphonyl chloride, isothiocyanate, phosphoramidite, vinyl sulphone, maleimide, halotriazine, iodoacetamide and N-hydroxysuccinimide; see also Andrew Garman: "Non-Radioactive Labelling: A Practical Introduction" published by Academic Press, London, 1997, and references cited therein.

These compounds may be linked, preferably through $R^b$ or alternatively through $R^2$, $R^3$, $R^4$, $R^5$, $R^7$ or $R^8$ to a support such as polyethylene glycol, polyethyleneimine, polysaccharides such as dextran, or a derivatised substrate such as that used in solid phase synthesis e.g. polystyrene, polyacrylate or glass.

Preferably $R^a$ is $C_1$–$C_4$ alkylene. Certain of these compounds can be made by an advantageous process which forms another aspect of this invention, and which comprises reacting

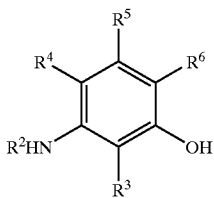

with GG¹
where
G is CHR=CR— where R is H or $C_1$–$C_4$ alkyl
and G¹ is an electron withdrawing group for example CN or carboxy where the carboxy group is acid, salt, ester or amide.

Other compounds may be made by the use of $G^2R^aG^1$ where $G^2$ is a leaving group and $R^a$ and $G^1$ are herein defined.

An intermediate compound of formula (I) may be immobilised on a support and there reacted to form the desired dye. This method may give access to a combinatorial library of dyes or an easy way of purifying dyes, or may permit the labelling of a first nucleotide or amino acid of a solid phase oligonucleotide or oligopeptide synthesiser.

In one aspect, this invention provides use of the said intermediate to make a dye selected from a defined group, or a leuco-dye or reduced analogue of said dye. In another aspect, the invention provides the resulting dyes, and their leucodye analogues, as new compounds. The dyes are as follows (in each case, $R^1$, $R^2$, $R^3$, $R^4$ and $R^5$ are as defined above for the intermediate compound (I); and may be the same or different at different parts of the molecule):

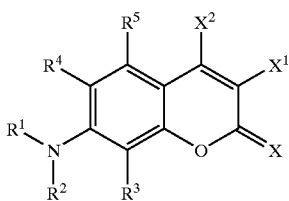

(II)

where
X is O, NH or =NCOAr
$X^1$ is H, CN, CHO, CH=N⁺($R^dR^e$), NO, COOH, $COOR^f$, $CONR^gR^h$, $C_1$–$C_{10}$ alkyl, aralkyl or aryl or

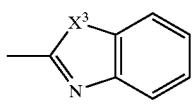

where
$X^3$ is NH, N–$R^k$, O or S, wherein $X^1$ is either unsubstituted or substituted by: a group to modify solubility; or a group to modify electronic and/or spectral properties; or a functional group for linking to another component,
$R^d$ and $R^e$ are alkyl, aryl, aralkyl,
$R^f$, $R^g$, $R^h$ and $R^k$ are $R^aR^c$ wherein $R^a$ and $R^c$ are herein defined,
$X^2$ is H, CN, $OR^i$, Cl, Br, alkyl or aryl which maybe unsubstituted or substituted by: a group to modify solubility; or a group to modify electronic and/or spectral properties; or a functional group for linking to another component;

where $R^i$ is $MeC_6H_4SO_2$—, $CH_3SO_2$—, P=O($OR^j$)₂
$R^j$ is alkyl, aryl, aralkyl
$X^1$ and $X^2$ may contain atoms which are linked to form a carbocyclic, heterocyclic, aliphatic or aromatic ring system which may be substituted or unsubstituted with a group to modify electronic and/or spectral properties and/or a group to modify solubility properties and/or a functional linking group;
provided that, when X is O, then $X^1$ is not H, CN, or $C_1$–$C_{10}$ alkyl, aralkyl or aryl; and provided that when X is O, then $X^3$ is not S;

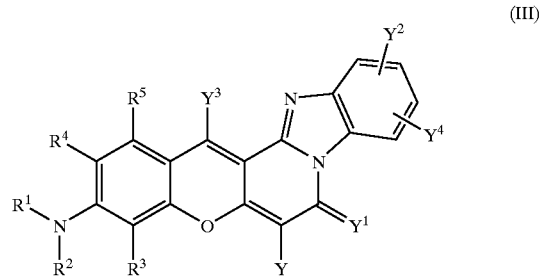

(III)

where
Y is CN or $CONH_2$ or $CH_2NH_2$,
$Y^1$ is NH or O or =NCOAr,
$Y^2$ and $Y^4$ are: H; or $C_1$–$C_{10}$ alkyl or aralkyl which may optionally contain 1 to 4 oxygen, nitrogen or sulphur atom in a straight or branched chain; or $R^c$ where $R^c$ is a group to modify solubility, or a group to modify electronic and/or spectral properties, or a functional linking group; or —$R^aR^c$ wherein $R^a$ and $R^c$ are herein defined,
$Y^3$ is H or CN;

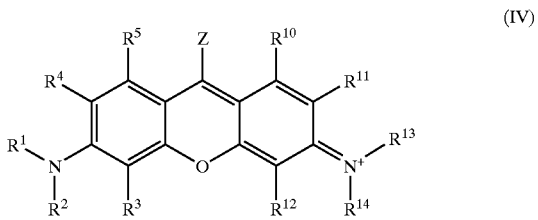

(IV)

where
$R^{10}$, $R^{11}$, $R^{12}$, $R^{13}$ and $R^{14}$ are the same or different and each is: H; or $C_1$–$C_{10}$ alkyl or aralkyl which may optionally contain 1 to 4 oxygen, nitrogen or sulphur atoms in a straight or branched chain; or $R^c$ where $R^c$ is a group to modify solubility, or a group to modify electronic and/or spectral properties, or a functional linking group; or —$R^aR^c$ wherein $R^a$ and $R^c$ are herein defined,
$R^{10}$ and $R^{11}$; and/or $R^{13}$ and $R^{11}$; and/or $R^{12}$ and $R^{14}$ may be linked to form an extended ring system, carbocyclic or heterocyclic, aromatic or aliphatic which is unsubstituted or substituted as above,
Z is aryl which is unsubstituted or substituted by: a group to modify solubility; or a group to modify electronic and/or spectral properties; or a functional group for linking to another component, provided that Z is not 2-carboxy-3, 4,5,6-tetrachloro phenyl;

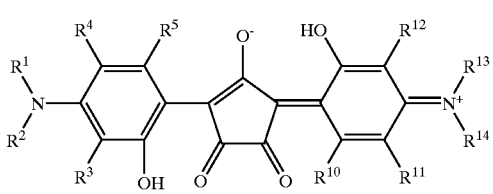
(V)

provided that NR$^{13}$R$^{14}$ is different from NR$^1$R$^2$;

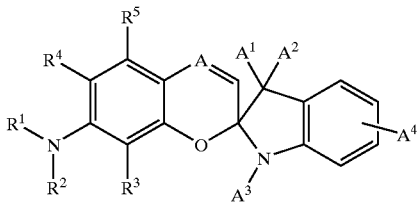
(VI)

where

A is N or CH

A$^1$, A$^2$ A$^3$ and A$^4$ are the same or different and each is: H; or C$_1$–C$_{10}$ alkyl or aralkyl which may optionally contain 1 to 4 oxygen, nitrogen or sulphur atom in a straight or branched chain; or R$^c$ where R$^c$ is a group to modify solubility, or a group to modify electronic and/or spectral properties, or a functional linking group; or —R$^a$R$^c$ where R$^a$ and R$^c$ are herein defined;

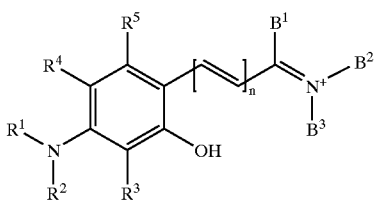
(VII)

where n is 0, 1 or 2, B$^1$ is H, C$_1$–C$_{10}$ alkyl, aryl or aralkyl either unsubstituted or substituted by a group to modify solubility or a group to modify electronic and/or spectral properties, or a functional linking group, Cl, Br or F, B$^2$ and B$^3$ are the same or different and are selected from C$_1$–C$_{10}$ alkyl, aryl or aralkyl either unsubstituted or substituted by a group to modify solubility or a group to modify electronic and/or spectral properties, or a functional linking group, B$^1$ and B$^2$ and/or B$^1$ and B$^3$ and/or B$^2$ and/or B$^3$ may be linked to form an extended ring system, carbocyclic or heterocyclic, aromatic or aliphatic which is unsubstituted or substituted by a group to modify solubility, or a group to modify electronic and/or spectral properties, or a functional linking group;

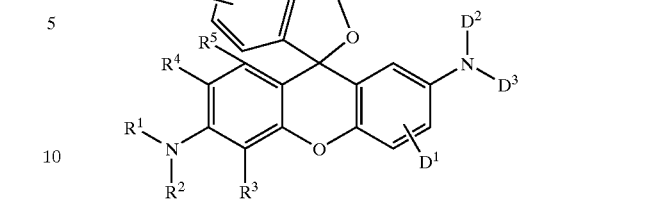
(VIII)

where

D, D$^1$, D$^2$ and D$^3$ are the same or different and each is: H; or C$_1$–C$_{10}$ alkyl or aralkyl which may optionally contain 1 to 4 oxygen, nitrogen or sulphur atom in a straight or branched chain; or R$^c$ where R$^c$ is a group to modify solubility, or a group to modify electronic and/or spectral properties, or a functional linking group; or —R$^a$R$^c$ where R$^a$ and R$^c$ are herein defined;

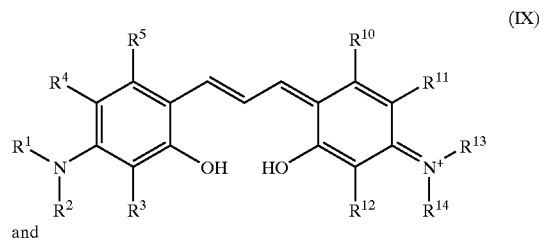
(IX)

and

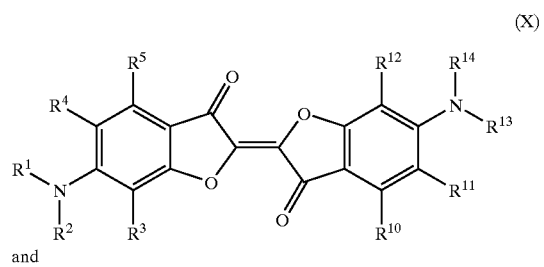
(X)

and

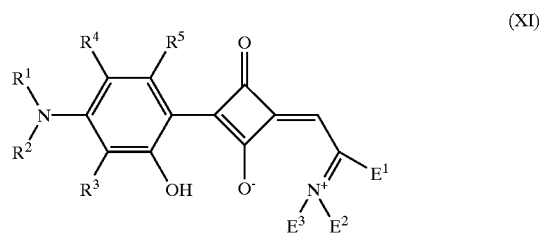
(XI)

where

E$^1$ is H, C$_1$–C$_{10}$ alkyl, aryl or aralkyl either unsubstituted or substituted by a group to modify solubility or a group to modify electronic and/or spectral properties, or a functional linking group, Cl, Br or F, E$^2$ and E$^3$ are the same or different and are selected from C$_1$–C$_{10}$ alkyl, aryl or aralkyl either unsubstituted or substituted by a group to modify solubility or a group to modify electronic and/or spectral properties, or a functional linking group, E$^1$ and E$^2$ and/or E$^1$ and E$^3$ and/or E$^2$ and/or E$^3$ may be linked to form an extended ring system, carbocyclic or heterocyclic, aromatic or aliphatic which is unsubstituted or substituted by a group to modify solubility, or a group to modify electronic and/or spectral properties, or a functional linking group;

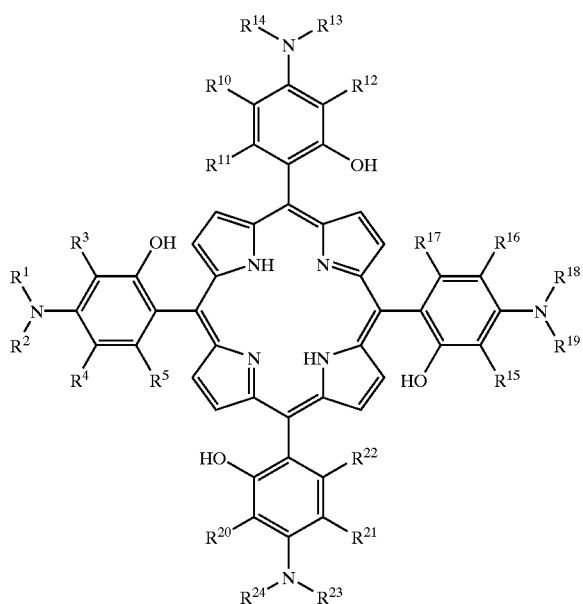

(XII)

where $R^{15}$, $R^{16}$, $R^{17}$, $R^{18}$, $R^{19}$, $R^{20}$, $R^{21}$, $R^{22}$, $R^{23}$ and $R^{24}$ are the same or different and each is: H; or $C_1$–$C_{10}$ alkyl or aralkyl which may optionally contain 1 to 4 oxygen, nitrogen or sulphur atoms in a straight or branched chain; or $R^c$ where $R^c$ is a group to modify solubility, or a group to modify electronic and/or spectral properties, or a functional linking group; or —$R^a R^c$ wherein $R^a$ and $R^c$ are herein defined, $R^{16}$ and $R^{17}$; and/or $R^{21}$ and $R^{22}$; and/or $R^{15}$ and $R^{18}$ and/or $R^{16}$ and $R^{19}$; and/or $R^{20}$ and $R^{23}$; and/or $R^{21}$ and $R^{24}$ may be linked to form an extended ring system, carbocyclic or heterocyclic, aromatic or aliphatic which is unsubstituted or substituted as above.

By virtue of the reactive group $R^1$, the dyes of the present invention may be combined with target materials to form conjugates. Suitable target materials may include antibodies, antigens, proteins, carbohydrates, polysaccharides, lipids, nucleotides, nucleic acids, polymer particles or surfaces and glass beads and surfaces. Thus, for example, the carboxyl group of $R^1$ may be converted to an N-hydroxysuccinimidyl ester for linking with an amino group of a polypeptide. These methods and the products resulting from them, either dye-labelled biomolecules or dyes immobilised on particulate or massive surfaces, are envisaged as further aspects of the invention.

The main uses for the dyes of this invention are expected to be for labelling biologically active molecules such as nucleotides, oligo- and poly-nucleotides, nucleic acids and nucleic acid analogues (e.g. PNA), amino acids, peptides, proteins, antibodies, haptens, etc. for use in biological detection systems. Alternatively, the dyes may be conjugated to species which can direct the path of the dye within or aid entry to or exit from cells (live or dead); such as for example long alkyl residues to allow permeation of lipophilic membranes, or intercalating species to localise a dye in a nucleus or other cellular enclave containing double-stranded DNA or in vitro applications involving double-stranded nucleic acids. Dyes may also be immobilised on substrates such as particles or beads. The dyes may be involved in a resonance energy transfer system of the kind described in EPA 747 700.

The actual properties of the dyes used as detection labels vary. The observed property may simply be colour (based on light absorbance), luminescence or fluorescence (based on light emission) or other properties such as fluorescence lifetimes or degree of polarisation of emitted light. The dyes may also be used outside biological detection systems. For example, a dye may be immobilised on a probe for use in a chemical detection system e.g. a colour change, pH probe, or a chemical detector based on solvatochromism, electrochromism, thermochromism or photochromism. Reactive dyes may also be useful in printing e.g. in order to obtain improved substantivity effects.

There follow a number of example applications, which indicate a general chemical strategy by which intermediate compounds of formula (I) are used to make various families of dyes. The lettering system used is consistent within any particular application, but may not be consistent with that used in the introduction above and the claims below.

Application 1: Green-fluorescent Coumarin Dyes

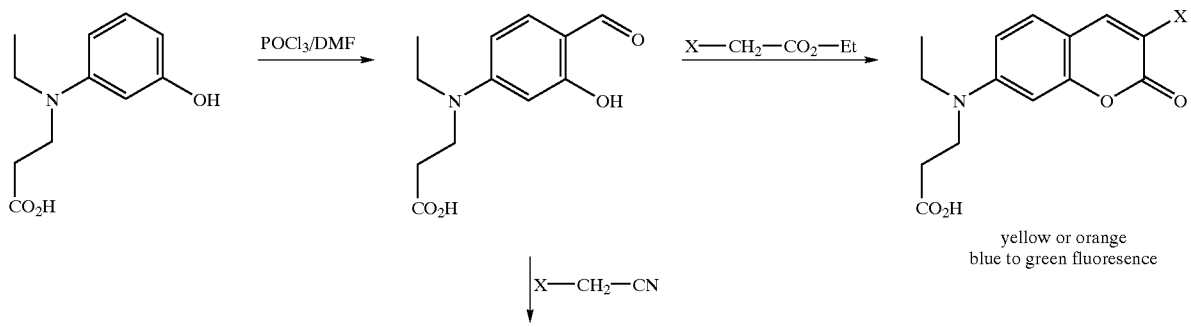

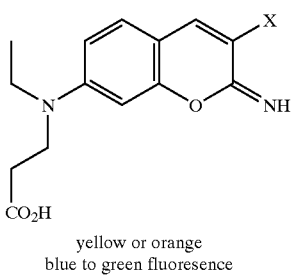

yellow or orange
blue to green fluoresence

If X is simply —CN or an aryl substituent then the dyes are colourless with a blue fluorescence emission. To obtain yellow dyes with a green fluorescence the moiety X is a benzimidazole, benzoxazole or benzthiazole ring system, with or without additional substituents (e.g. halogen, sulphonic acid).

Application 2: Yellow and Orange Fluorescent Coumarin Dyes

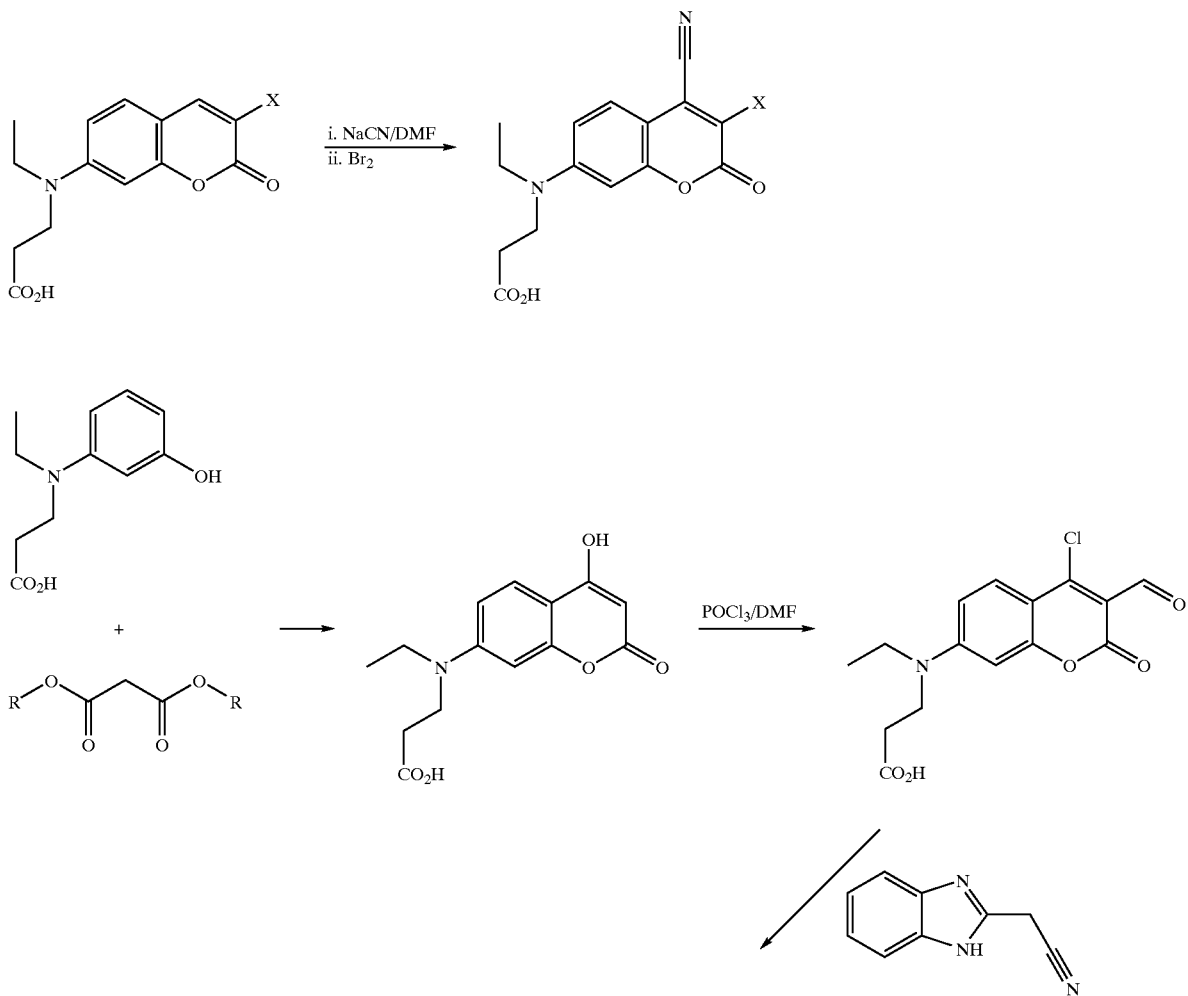

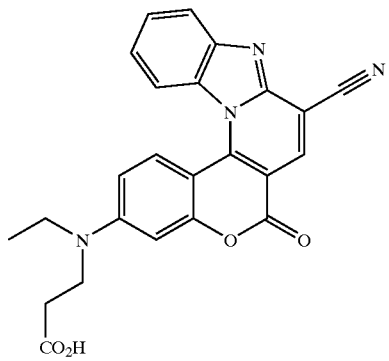
20
Application 3: Red-fluorescent Benzopyrano-benzimidazo-pyridines
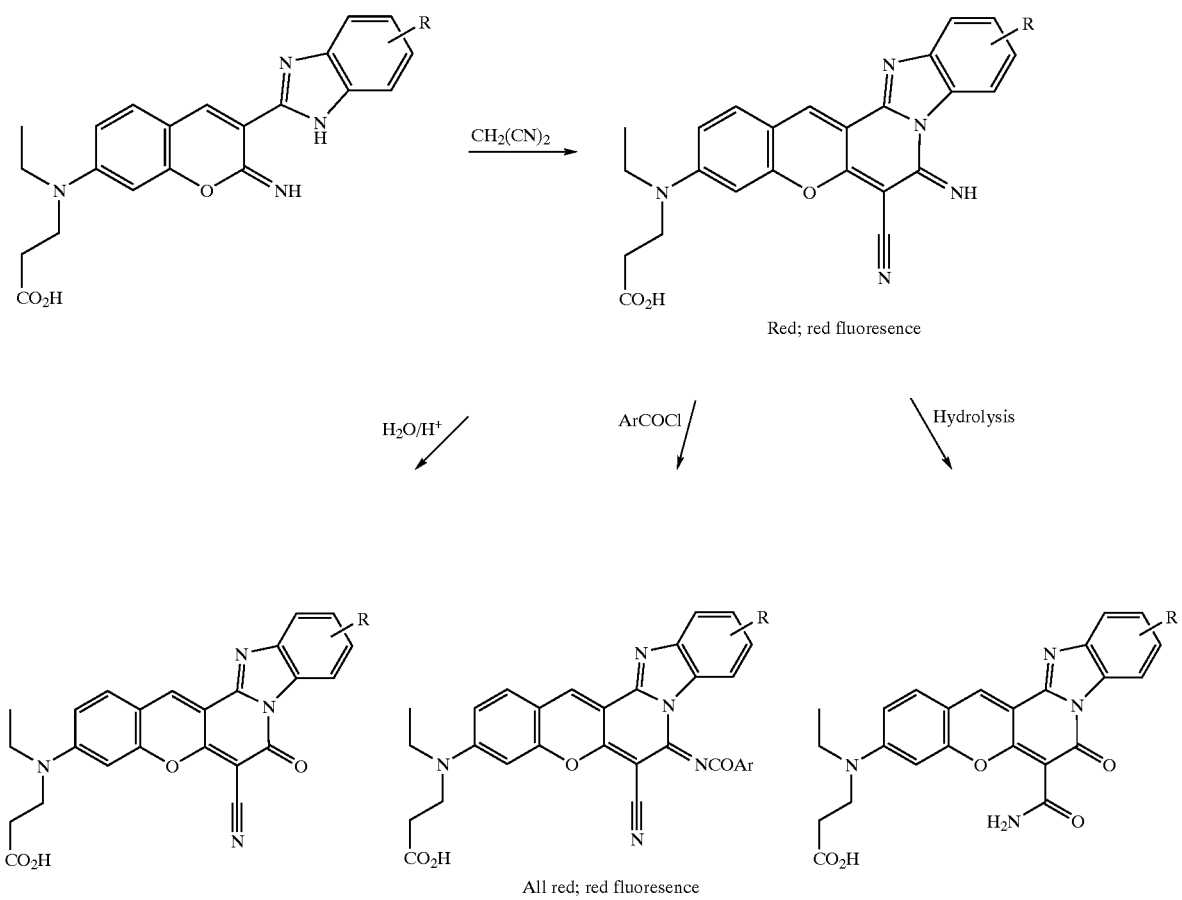
Substituents R in the benzimidazole ring may be H or any common substituent, but most usefully could be —SO₃H to enhance water solubility or a grouping capable of forming a linkage, e.g. —CO₂H, to give a bis-functional dye.

Application 4: Red-fluorescent Rhodamine Dyes

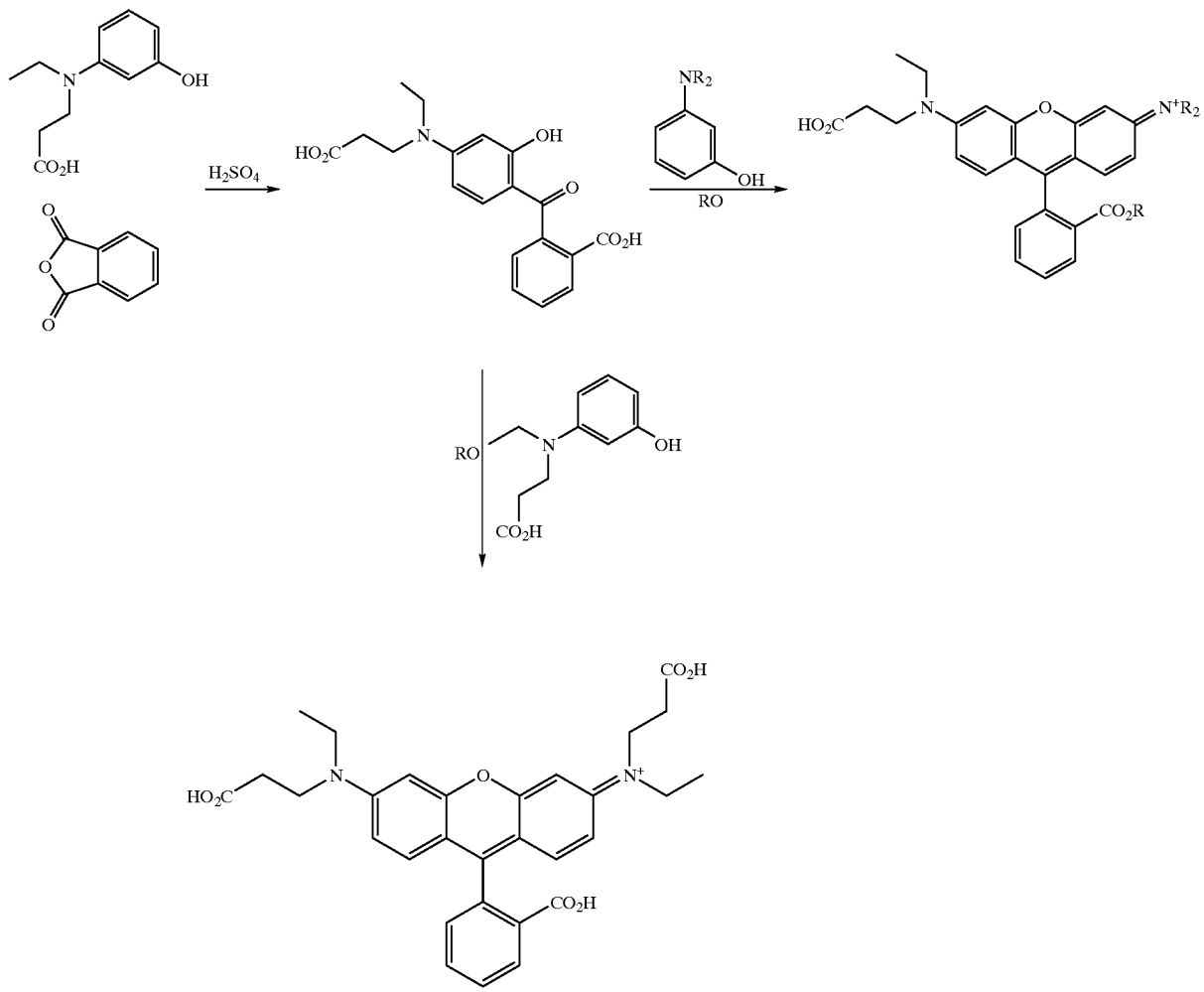

As shown above, such dyes may be symmetrical or unsymmetrical. There is the problem of the additional carboxylic acid group in the meso phenyl ring, which should preferentially be esterified. Alternatively, sulphorhodamines or non-meso-carboxylated analogues could be considered:

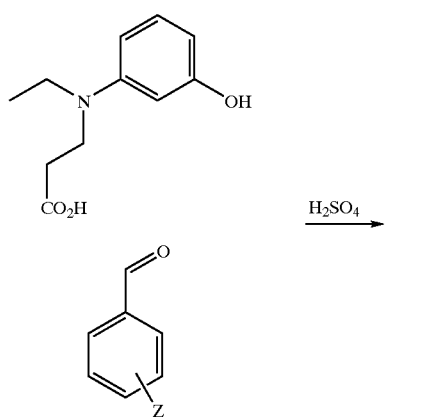

-continued

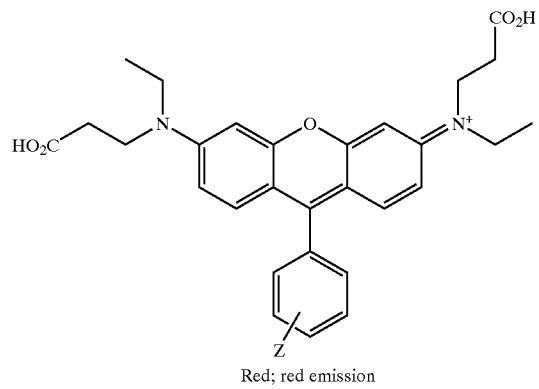

Red; red emission

Z = ———$SO_3H$ sulphorhodamines
Z = other substituent (e.g. halogen, alkoxyl, alkyl, cyano).

Application 5: Near-infrared Absorptive Croconium Dyes
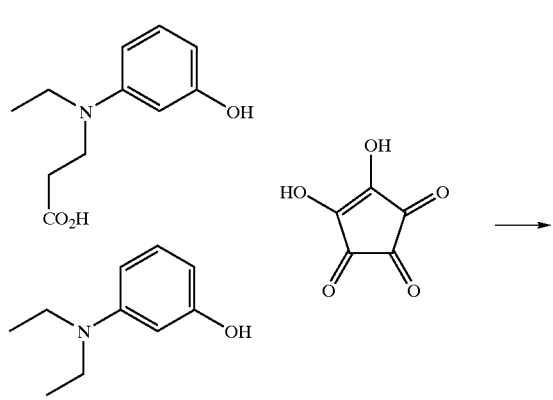
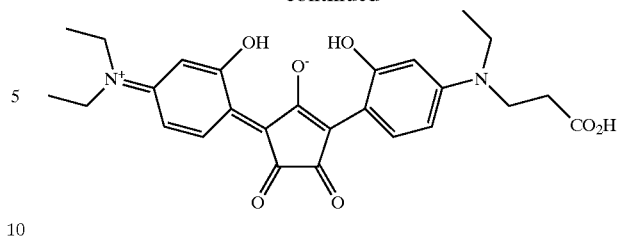
Use of this type of intermediate (i.e. with a meta-hydroxy group) is essential for the success of the reaction with croconic acid. If the dyes are fluorescent, then the emission will probably lie beyond the range of most fluorimeters, probably near 900 nm.
Application 6: pH Sensitive Photochromic Dyes
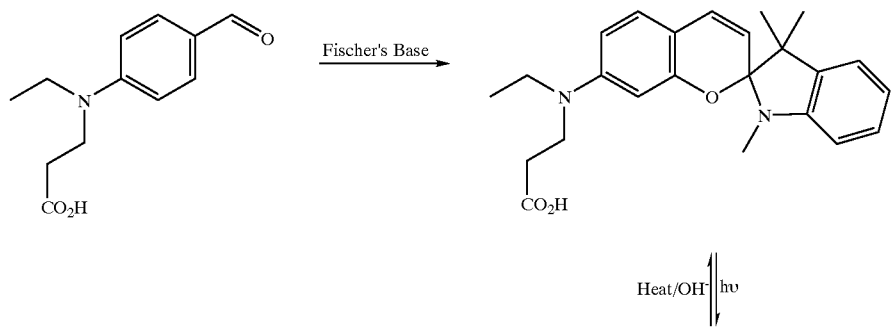
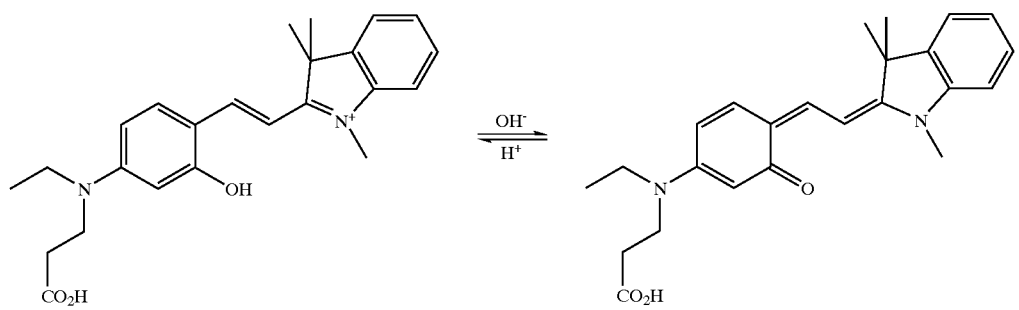
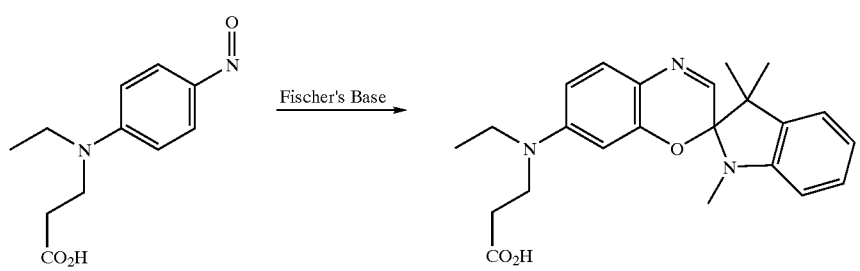

Application 7: pH Sensitive Green-black Fluorans

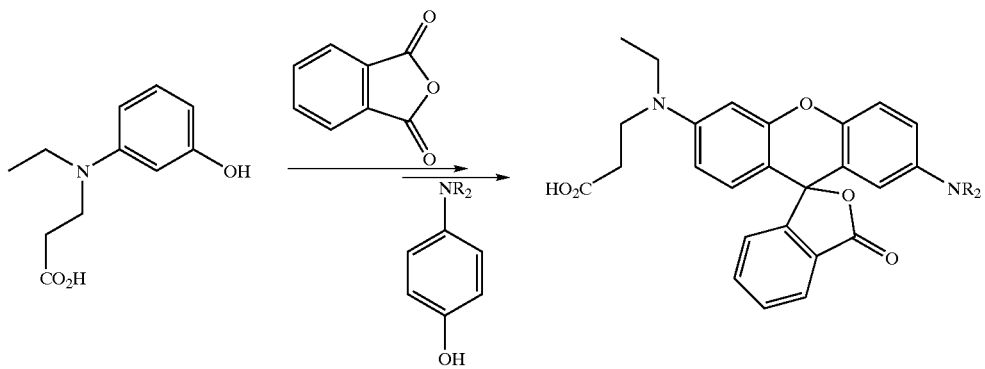

The open chain form of the dye is not fluorescent and is usually very dark in colour due to its multiple absorption band chromophore.

Application 8: Styryl Hemi-cyanines

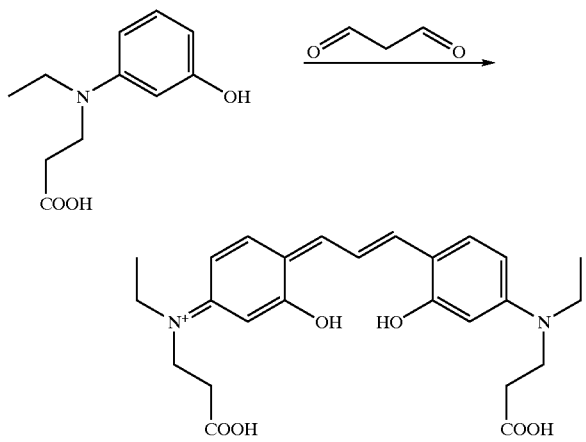

Application 9: Leuco Dyes for Use as Enzyme Substrates

These are not dyes, as such, but a reduced, or leuco, form of those already listed which for example, may be chemically or enzymatically oxidised back to parent dye molecule. The dyes may be derivatised slightly to increase their stability.

Application 10: Oxindigo Derivatives

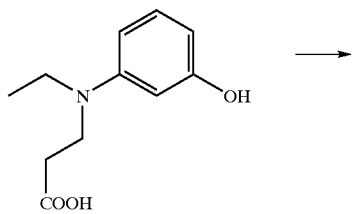

-continued

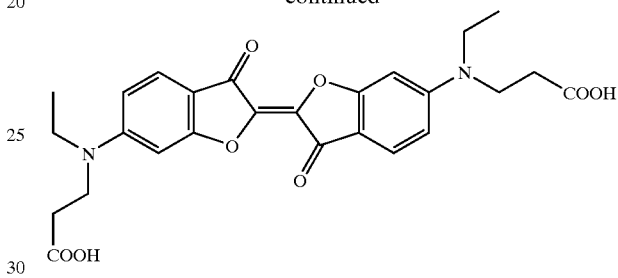

These dyes can have large Stoke's shift (50–100 nm) emitting in the red, $\lambda_{max}$(Abs.) 510–530 nm, $\lambda_{max}$ (Em.) 600–620 nm. They are also reported as being strongly fluorescent with high colour fastness. (Angew. Chem. Int. Ed. Engl. 1996, 35 (9) 1016), and therefore the ability to sum multiple scans.

Application 11: Squarylium Dyes

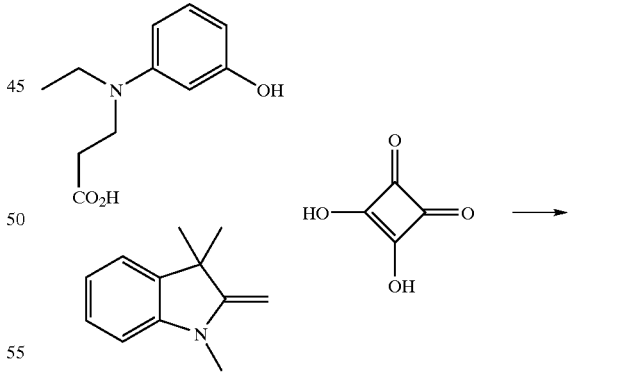

Application 12: 5,10,15,20-Tetraarylporphyrin Dyes

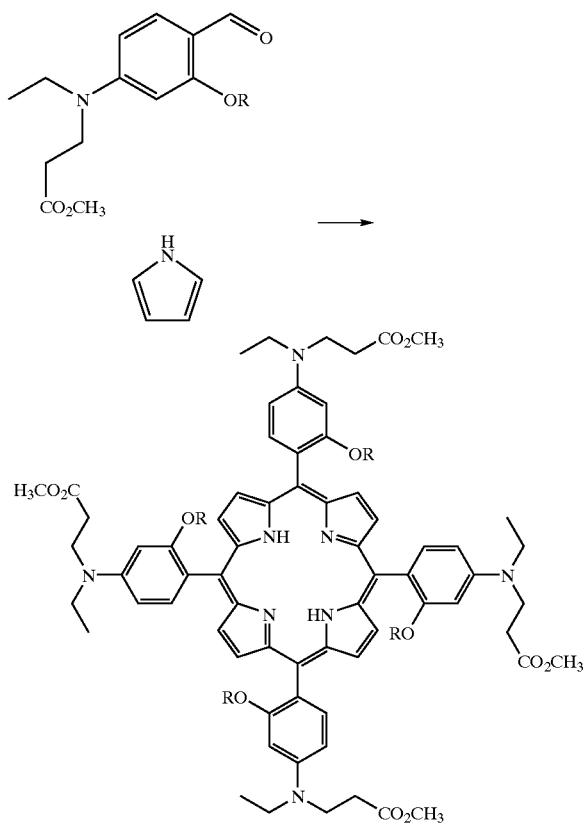

with or without a central metal ion.

The following examples illustrate the invention. Examples 1 to 5, shows the preparation of compounds according to formula (I). Examples 6 to 18 show the use of intermediates of formula (I) in the preparation of various dyes.

Examples of Intermediate (I)

EXAMPLE 1

3-N-Ethyl-N-(2'methoxycarbonylethyl)-aminophenol (Ia)

$R^1$=—$CH_2CH_2CO_2Me$, $R^2$=Et, $R^3$=$R^4$=$R^5$=$R^6$=H

3-Ethylaminophenol (5 g, 36 mmol), methyl acrylate (10 g, 120 mmol) and acetic acid (10 ml) were heated at reflux for 5 hours. The excess methyl acrylate:acetic acid was then removed under reduced pressure at a temperature no higher than 70° C. The residual oil was extracted into ethyl acetate (50 ml), washed with saturated sodium bicarbonate solution (2×50 ml), water (100 ml), dried over $MgSO_4$, filtered and evaporated to dryness in vacuo. The product (Ia) was isolated as a brown oil (7.2 g, 90%).

$^1$H NMR (300 MHz, $CDCl_3$) 1.20 (t, 3H, J=6.9 Hz), 2.63 (t, 2H, J=7.1 Hz), 3.33 (q, 2H, J=6.9 Hz), 3.60 (t, 2H, J=7.5 Hz), 3.70 (s, 3H), 6.15 (d, 1H, J=5.4 Hz), 6.18 (s, 1H), 6.27 (d, 1H, J=5.4 Hz), 7.04 (t, 1H, J=6.9 Hz).

EXAMPLE 2

3-N-(2'Methoxycarbonylethyl)-N-ethylamino)-2-methylphenol (Ib)

$R^1$=—$CH_2CH_2CO_2Me$, $R^2$=H, $R^3$=Me, $R^4$=$R^5$=$R^6$=H

3-Amino-2-methylphenol (1 g, 8.1 mmol), methyl acrylate (0.73 ml, 8.1 mmol) and acetic acid (2 ml) were heated together at reflux for 5 hrs and then cooled to room temperature. The excess acetic acid was removed under reduced pressure and the residue purified by column chromatography (silica, 1:3 ethyl acetate: 40–60 petroleum ether). The product (Ib) was obtained as an off white solid (0.81 g, 48%).

$^1$H NMR (300 MHz, $CDCl_3$) 1.98 (s, 3H,), 2.66 (t, 2H, J=6.3 Hz), 3.49 (t, 2H, J=6.3 Hz), 3.71 (s, 3H), 6.25 (dd, 2H, J=7.8 Hz), 6.97 (t, 1H, J=8.1 Hz).

EXAMPLE 3

Tetra-n-butylammonium-6-hydroxy-2-(N-2'methoxycarbonylethyl-benzenesulphonate (Ic)

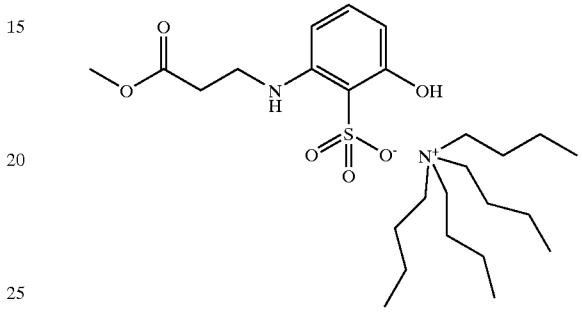

(Ic)

2-Amino-6-hydroxybenzenesulfonic acid (236 mg, 1.25 mmol) and tetra-n-butylammonium hydroxide (1M solution in methanol, 1.25 ml, is 1.25 mmol) were stirred together at room temperature for 1 hr. The methanol was removed under reduced pressure to leave a yellow oil which was washed with ether (3×5 ml). To the yellow oil was added methyl acrylate (0.5 ml, 5.5 mmol) and acetic acid (1 ml) and the mixture heated at reflux for 48 hrs. Excess methyl acrylate:acetic acid was removed under reduced pressure and the residue purified by column chromatography (silica: 20% methanol in ethyl acetate). The product (Ic) was obtained as an off white solid (50 mg, 7.3%), partially in the form of the tetrabutylammonium salt.

$^1$H NMR (300 MHz, $d_6$DMSO) 3.23 (t, 2H, J=5.7 Hz), 3.53 (t, 2H, J=5.7 Hz), 3.60 (s, 3H), 5.87 (s, 1H), 6.01 (d, 1H, J=6.3 Hz), 7.10 (d, 1H, J=8.4 Hz).

EXAMPLE 4

3-Acetoxy-N-ethyl-N-(2'methoxycarbonylethyl)-aniline (Id)

$R^1$=—$CH_2CH_2CO_2Me$, $R^2$=Et, $R^3$=$R^4$=$R^5$=$R^6$=H, $OCOCH_3$

3-N-Ethyl-N-(2'methoxycarbonylethyl)-aminophenol (Ia) (7.2 g, 30 mmol) and acetic anhydride (10 ml) were heated at 100° C. for 4 hours. On cooling the reaction mixture was poured onto ice and the pH adjusted to 4–5 with KOH solution (10%). The product was extracted into dichloromethane, dried over $MgSO_4$, filtered and evaporated to dryness in vacuo. The product (Id) was isolated as a brown oil (7.4 g, 93%).

$^1$H NMR (300 MHz, $CDCl_3$). 1.14 (t, 3H, J=13.3 Hz), 2.28 (s, 3H), 2.60 (t, 2H, J=7.4 Hz), 3.36 (q, 2H, J=7.2 Hz), 3.63 (t, 2H, J=7.4 Hz), 3.71 (s, 3H), 6.34 (s, 1H), 6.39 (d, 1H, J=7.4 Hz), 6.52 (d, 1H, J=8.4 Hz), 7.20 (t, 1H, J=8.3 Hz).

EXAMPLE 5

2-Acetoxy-4-(N-ethyl-N-(2'methoxycarbonylethyl)-aminobenzaldehyde (Ie)

$R^1$=—$CH_2CH_2CO_2Me$, $R^2$=Et, $R^3$=$R^4$=$R^5$=H, $R^6$= CHO, $OCOCH_3$

3-Acetoxy-N-ethyl-N-(2'methoxycarbonylethyl)-aniline (Id) (6.5 g, 24 mmol) was dissolved in dimethylformamide (10 ml, 0.13 mol) and cooled to below 5° C. Phosphorus oxychloride (3 ml, 33 mmol) was added dropwise maintaining the temperature below 10° C. The reaction mixture was heated to 90° C. for 1.5 hours and then cooled to room temperature and carefully poured onto ice (400 g). The pH was adjusted to 5 with the addition of saturated sodium acetate solution and stirred for 3 hours. The product was extracted into dichloromethane (2×150 ml), washed with water (2×150 ml), dried over MgSO$_4$, filtered and evaporated to dryness in vacuo. The product was purified by column chromatography (silica; ethyl acetate) and isolated as a pale yellow oil (4.1 g, 58%).

$^1$H NMR (300 MHz, CDCl$_3$) 1.18 (t, 3H, J=8.6 Hz), 2.38 (s, 3H), 2.60 (t, 2H, J=7.1 Hz), 3.45 (q, 2H, J=7.2 Hz), 3.69 (t, 2H, J=7.2 Hz), 3.76 (s, 3H), 6.56 (s, 1H), 6.59 (d, 1H, J=9 Hz), 7.69 (d, 1H, J=9 Hz), 9.77 (s, 1H).

Examples of Green Fluorescent Coumarin Dyes (II)—Application 1

EXAMPLE 6

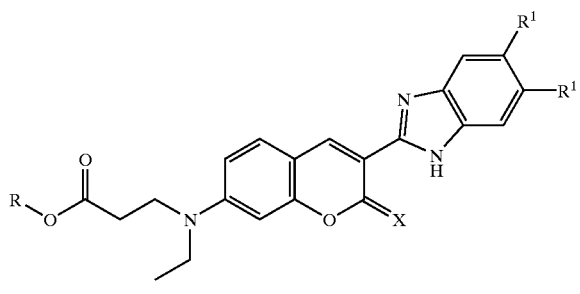

IIa; R = Me, X = NH, R$^1$ = H
IIb; R = H, X = NH, R$^1$ = H
IIc; R = H, X = O, R$^1$ = H
IId; R = H, X = O, R$^1$ = SO$_3$K

Benzimidazol-2'-yl-7-Methyl-N (2"methoxycarbonylethyl)amino)imino coumarin (IIa)

2-Acetoxy-4-(N-ethyl-N-(2'methoxycarbonylethyl)-aminobenzaldehyde (Ie) (2.18 g (60% purity), 4.5 mmol), 2-cyanomethylbenzimidazole (0.72 g, 4.5 mmol), piperidine (0.45 ml) and dimethylformamide (5 ml) were stirred together at room temperature for 4 hours. Methanol (15 ml) was added and the product filtered off, washed with methanol and dried. The product was isolated as a yellow solid (1.2 g, 68%).

$\lambda_{max}$ (DMF) 422 nm.

Fluorescence (DMF) $\lambda_{ex}$ 422 nm; $\lambda_{em}$ 490 nm; Stokes Shift 68 nm.

$^1$H NMR (300 mHz, d$_6$DMSO), 1.10 (t, 3H, J=7.1 Hz), 2.62 (t, 2H, J=6.9 Hz), 3.42 (q, 2H, J=6.6 Hz), 3.61 (s, 3H), 3.66 (t, 2H, J=6.6 Hz), 6.43 (s, 1H), 6.62 (d, 1H, J=8.7 Hz), 7.17 (m, 2H), 7.45 (d, 1H, J=8.7 Hz), 7.62 (broad s, 2H), 8.36 (broad s, 1H).

Benzimidazol-2'-yl-7-(N-carboxyethyl-N-ethylamino) imino coumarin (IIb)

Ethanolic potassium hydroxide (2 ml (5%)) was added to a solution of the coumarin (IIa) (0.20 g, 5.13 mmol) in ethanol (10 ml). The reaction mixture was heated at reflux for 10 mins at which point a further aliquot of 5% ethanolic KOH (4 ml) was added and the mixture was heated at reflux for a further 15 mins. On cooling to room temperture the pH was adjusted to pH 5 with the addition of 10N hydrochloric acid. The ethanol was removed under reduced pressure and the residue dissolved in to dichloromethane (20 ml). The product was extracted into 1M NaOH solution (50 ml) and then reprecipitated by adding 10N hydrochloric acid, the solid was filtered off, washed with water and dried. The product (IIb) was obtained as a bright yellow solid (90 mg, 47%).

$\lambda_{max}$ (DMF) 425 nm.

Fluorescence (DMF) $\lambda_{ex}$ 425 nm; $\lambda_{em}$ 490 nm; Stokes Shift 65 nm. FAB-MS m/z=found 399 (MNa$^+$), 377 (MH$^+$) [theoretical (C$_{21}$H$_{20}$N$_4$O$_3$) 376].

$^1$H NMR (300 MHz. d$_6$DMSO), 1.13 (t, 3H, J=6.6 Hz,), 2.57 (t, 2H), 3.53 (q, 2H, J=7.5 Hz), 3.69 (t, 2H, J=7.5 Hz), 6.70 (s, 1H), 6.84 (d, 1H, J=11.0 Hz), 7.16 (m, 1H), 7.24 (m, 1H), 7.61 (m, 1H), 7.64 (m, 1H) 7.72 (d, 1H, J=9.2 Hz), 8.93 (s, 1H).

Benzimidazol-2'-yl-7-(N-carboxyethyl-N-ethylamino) coumarin (IIc)

Imino coumarin (IIa) (0.5 g, 1.28 mmol), water (45 ml) and conc. HCl (5 ml) were heated at 100° C. for 2 hours, over which time the dye dissolved and reprecipitated. The product was filtered off, washed with methanol and dried. The product was isolated as a bright yellow solid (0.3 g, 63%).

$\lambda_{max}$ (DMF) 438 nm.

Fluorescence (DMF) $\lambda_{ex}$ 438 nm; $\lambda_{em}$ 495 nm; Stokes Shift 57 nm.

$^1$H NMR (300 MHz, d$_6$DMSO), 1.10 (t, 3H, J=6.9 Hz), 2.57 (t, 2H, J=7.1 Hz), 3.52 (q, 2H, J=7.2 Hz), 3.68 (t, 2H, J=7.2 Hz), 6.70 (s, 1H), 6.84 (d, 1H, J=11.4 Hz), 7.16 (m, 2H), 7.60 (m, 2H), 7.73 (d, 1H, J=9.3 Hz), 8.96 (s, 1H).

3-(5',6'-disulphobenzimidazol-2'-yl-7-(N-carboxyethyl-N-ethylamino) coumarin (IId)

To coumarin (IIc) (90 mg, 0.24 mmol) was added chlorosulphonic acid (0.5 ml). The reaction mixture was stirred at 40° C. for 5 hrs, cooled, and then carefully quenched over ice. The orange precipitate was filtered off, washed with water, ethyl acetate and dried. The dye was purified by HPLC (RP C$_{18}$; 80:20 water:ethanol). The product (IId) was obtained as a orange solid (5 mg, 3.6%).

$\mu_{max}$ (1:1 MeOH:H$_2$O) 370 nm.

Fluorescence; none detected.

$^1$H NMR (300 MHz, d$_6$DMSO) 1.21 (t, 3H), 3.4 (broad t, 2H), 3.61 (q, 2H,), 4.04 (t, 2H), 6.91 (d, 1H), 7.59 (d, 1H), 7.70 (s, 2H), 7.98 (s, 1H), 8.92 (s, 1H).

It was noted that if coumarin dye (IId) was treated with methanol containing a catalytic quantity of sulphuric acid the non-fluorescent dye (IId) was converted to the highly fluorescent dye (IIe);

$\lambda_{max}$ (1:1 MeOH:H$_2$O) 424 nm.

Fluorescence (1:1 MeOH:H$_2$O) $\lambda_{ex}$ 406 nm; $\lambda_{em}$ 480 nm; Stokes Shift 74 nm.

EXAMPLE 7

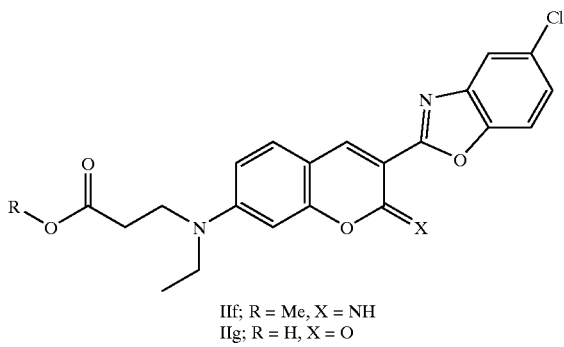

IIf; R = Me, X = NH
IIg; R = H, X = O

3-(6'chlorobenzimidazol-2'-yl-7(N-ethyl-N-(2"methoxycarbonylethyl) amino) imino coumarin—(IIf)

2-Acetoxy-4-(N-ethyl-N-(2'methoxycarbonylethyl)-amino)-benzaldehyde (Ie) (1 g, 3.4 mmol), 2-cyanomethyl-6-chloro-benzoxazole (0.66 g, 3.4 mmol), piperidine (0.6 ml) and dimethylformamide (2.5 ml) were stirred together at room temperature for 5 hours. The crude dye was precipitated from the reaction mixture by adding ether and then filtered off, washed with ether and dried. The dye was purified by column chromatography (silica; 1:4 methanol:ethyl acetate). The product (IIf) was obtained as an yellow/brown solid (0.5 g, 36%).

$\lambda_{max}$ (MeOH) 454 nm.

Fluorescence (MeOH) $\lambda_{ex}$ 453 nm; $\lambda_{em}$ 494 nm; Stokes Shift 41 nm.

$^1$H NMR (300 MHz, d$_6$DMSO), 1.10 (t, 3H, J=7.1 Hz), 2.64 (t, 2H, J=7.1 Hz), 3.47 (q, 2H, J=6.9 Hz), 3.61 (s, 3H), 3.68 (t, 2H, J=7.1 Hz), 6.50 (s, 1H), 6.65 (d, 1H, J=6.6 Hz), 7.30 (d, 1H, J=9.0 Hz), 7.53 (d, 1H, J=9.0 Hz), 7.76 (d, 1H, J=9 Hz), 8.35 (s, 1H).

Examples of Yellow and Orange Fluorescent Coumarins Dyes (II) and Intermediates Used in Their Preparation—Application 2

EXAMPLE 8

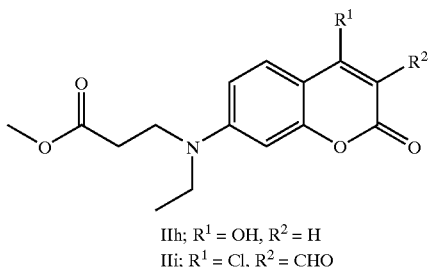

IIh; R$^1$ = OH, R$^2$ = H
IIi; R$^1$ = Cl, R$^2$ = CHO

7(N-Ethyl-N-(2'methoxycarbonylethyl)-amino)-4-hydroxy coumarin (IIh)

3-N-Ethyl-N-(2'methoxycarbonylethyl)-aminophenol (Ia), malonic acid bis-2,4,6-trichlorophenol ester and toluene (40 ml) were heated at reflux for 4 hours. On cooling the product was filtered off, washed with cold acetone and dried. The product (IIh) was obtained as a pale yellow solid (4.1 g, 63%).

$^1$H NMR (300 MHz, d$_6$DMSO) 1.07 (t, 3H, J=7.0 Hz), 2.60 (t, 2H, J=7.1 Hz), 3.43 (q, 2H, J=7.0 Hz), 3.60 (s, 3H), 3.62 (t, 2H, J=7.0 Hz), 5.26 (s, 1H), 6.49 (s, 1H), 6.67 (d, 1H, J=8.7 Hz), 7.54 (d, 1H, J=8.0 Hz).

4-Chloro-7-(N-ethyl-N-(2'methoxycarbonylethyl)-amino coumarin-3-carboxaldehyde (IIi)

7-(N-Ethyl-N-(2'methoxycarbonylethyl)-amino)-4-hydroxy coumarin (IIh) (2.5 g, 8.6 mmol) and dimethylformamide (15 ml) were cooled to below 5° C. Phosphorus oxychloride (1 ml) was added dropwise mantaining the temperature below 10° C. The reaction mixture was gently warmed to 35° C. for 3 hours. On cooling the reaction mixture was poured onto ice and stirred for one hour. The product was extracted into ethyl acetate (50 ml), washed with water (100 ml), dried over MgSO$_4$, filtered and evaporated to dryness in vacuo. The product was purified by column chromatography. (silica; ethyl acetate). The product (IIi) was isolated as an orange solid (2.18 g, 75%).

$^1$H NMR (300 MHz, d$_6$DMSO), 1.06 (t, 3H, J=7.0 Hz), 2.66 (t, 2H, J=7.1 Hz), 3.53 (q, 2H, J=7.0 Hz), 3.61 (s, 1H), 3.73 (t, 2H, J=7.0 Hz), 6.67 (s, 1H), 6.93 (d, 1H), 7.82 (d, 1H), 10.07 (s, 1H).

EXAMPLE 9

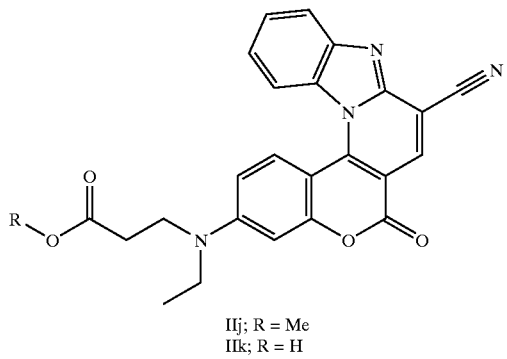

IIj; R = Me
IIk; R = H

3-(N-ethyl-N-(2'methoxycarbonylethyl)-amino)-6oxo-6H-[1]Benzopyrano[3',4':5,6]pyrido[1,2a]benzimidazole-8-carbonitrile, (IIj)

Coumarin (IIi) (0.5 g, 4.8 mmol), 2-cyanomethylbenzimidazole (0.23 g, 4.8 mmol) and acetic anhydride (5 ml) were heated together at 100° C. for 4 hours. On cooling the product was precipitated out of the reaction mixture with ether. The product was filtered off, washed with ether and dried. The product (IIj) was obtained as an orange solid (0.5 g, 74%).

$\lambda_{max}$ (MeOH) 490 nm.

Fluorescence (MeOH) $\lambda_{ex}$ 490 nm; $\lambda_{em}$ 540 nm; Stokes Shift 50 nm.

$^1$H NMR (300 MHz, d$_6$DMSO), 1.16 (t, 3H, J=6.8 Hz), 2.70 (t, 2H, J=6.9 Hz,), 3.56 (q, 2H, J=6.9 Hz), 3.63 (s, 3H), 3.76 (t, 2H, J=7.4 Hz), 6.81 (s, 1H), 6.88 (d, 1H, J=9 Hz), 7.41 (t, 1H, J=7.8 Hz), 7.63 (t, 1H, J=7.5 Hz), 7.98 (d, 1H, J=8.1 Hz), 8.13 (d, 1H, J=8.4 Hz), 8.15 (d, 1H, J=9.6 Hz), 8.51 (s, 1H).

3-(2-carboxyethyl-N-ethylamino)-6-oxo-6H-[1]Benzopyrano[3',4':5,6]pyrido[1,2a]benzimidazole-8-carbonitrile, (IIk)

Coumarin (IIj) (50 mg, 0.11 mmol) and ethanolic KOH (0.5 ml (5%)) were heated at reflux for 10 mins. On cooling the pH was adjusted to 7 with hydrochloric acid. The product was filtered off, washed with water and dried. The product was obtained as an orange solid (50 mg, 106% —still contaminated with inorganic salts).

$\lambda_{max}$ (MeOH) 456 nm.

Fluorescence (MeOH) $\lambda_{ex}$ 487 nm; $\lambda_{em}$ 540 nm; Stokes Shift 50 nm.

$^1$H NMR (300 MHz, $d_6$DMSO), 1.16 (t, 3H, J=6.8 Hz), 2.58 (t, 2H, J=7.4 Hz), 3.43 (q, 2H, J=6.9 Hz), 3.60 (t, 2H), 6.33 (s, 1H), 6.39 (d, 1H, J=8.1 Hz), 6.63 (d, 1H, J=8.4 Hz), 7.07 (d, 1H, J=8.7 Hz), 7.16 (t, 1H, J=8.0 Hz), 7.51 (t, 1H, J=7.8 Hz), 7.90 (d, 1H, J=7.8 Hz), 8.6 (s, 1H).

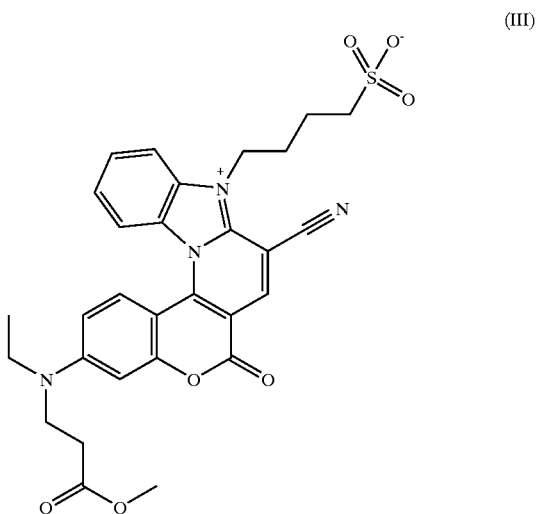

(III)

3-(N-ethyl-N-(2'methoxycarbonylethyl)-amino)-6-oxo-6H-[1]Benzopyrano[3',4':5,6]pyrido-3-sulphobutyl-[1,2a]benzimidazolium-8-carbonitrile (III)

Coumarin (IIj) (50 mg, 0.11 mmol); 1,4-butanesultone (17.5 mg, 0.13 mmol) and butyronitrile (0.5 ml) were heated together at reflux for 5 hours. On cooling the dye was precipitated out of the reaction mixture with ethyl acetate and filtered off. The dye was purified by preparative TLC (RP $C_{18}$; 3:2 methanol:water). The product was obtained as an orange solid (16 mg, 25%).

MALDI-TOF-MS m/z=; found 576 (M); [theoretical ($C_{29}H_{28}N_4SO_7$) 576]

EXAMPLE 10

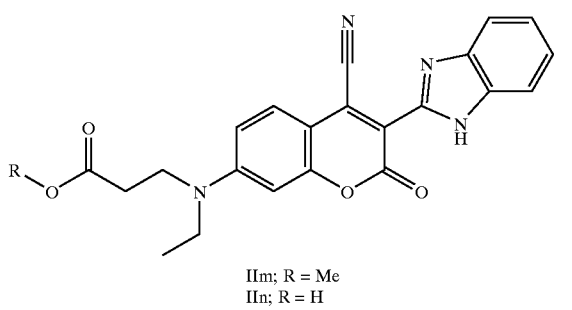

IIm; R = Me
IIn; R = H 3-(benzimidazol-2'-yl)-4-cyano-7-(N-ethyl-N-(2"methoxycarbonylethyl) amino) coumarin—(IIm) and 3-(benzimidazol-2'-yl)-4-cyano-7-(N-carboxyethyl-N-ethylamino) coumarin (IIn)

Imino coumarin (IIa) (1 g, 2.56 mmol) was dissolved in dimethylformamide (40 ml) and warmed to 40° C. Sodium cyanide (0.25 g, 5.1 mmol) in water (10 ml) was added and the solution stirred at 40° C. for 2 hours. The solution was then cooled to 10° C. and bromine (0.82 g, 5.1 mmol) added. Stirring was continued at this temperature for a further 2 hours. The solution was poured onto water (200 ml) and the precipitated product filtered off, washed with water and dried in a vacuum desiccator. The product was obtained as a red powder (0.67 g, 63%). The dye (50 mg) was purified by column chromatography (silica, 1:1 ethylacetate:40–60 petroleum ether) to give the methyl ester containing dye (IIm) (6 mg (12%)) and the free carboxylic acid containing dye (IIn) (3 mg (6%)).

Dye (IIm)

$\lambda_{max}$ (MeOH) 490 nm.

Fluorescence (MeOH) $\lambda_{ex}$ 490 nm; $\lambda_{em}$ 597 nm; Stokes Shift 107 nm.

$^1$H NMR (300 MHz, d6 DMSO) 1.1 (t, 3H), 2.67 (t, 2H), 3.57 (q, 2H), 3.62 (s, 3H), 3.73 (t, 2H), 6.82 (s, 1H), 7.01 (d, 1H), 7.21 (m, 2H), 7.26 (t, 2H), 7.70 (m, 3H).

Dye (IIn)

$\lambda_{max}$ (MeOH) 486 nm.

Fluorescence (MeOH) $\lambda_{ex}$ 492 nm; $\lambda_{em}$ 597 nm; Stokes Shift 105 nm.

$^1$H NMR (300 MHz, $d_6$ DMSO) 1.09 (t, 3H), 2.67 (t, 2H, J=6.9 Hz), 3.57 (q, 2H), 3.73 (t, 2H, J=6.9 Hz), 6.82 (s, 1H), 7.01 (d, 1H, J=9.3 Hz), 7.21 (m, 2H), 7.26 (t, 2H), 7.70 (m, 3H).

Examples of Red Fluorescent Benzopyranobenzimidazopyridine Dyes (III)— Application 3

EXAMPLE 11

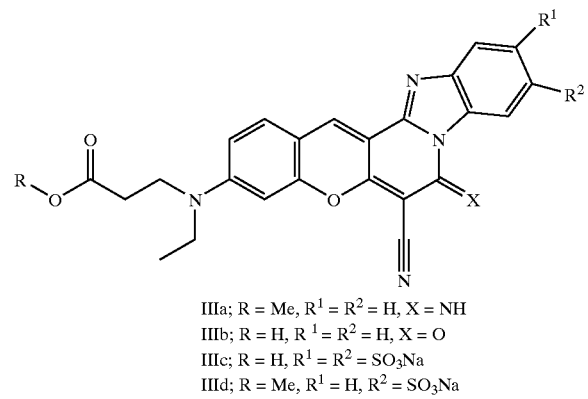

IIIa; R = Me, $R^1$ = $R^2$ = H, X = NH
IIIb; R = H, $R^1$ = $R^2$ = H, X = O
IIIc; R = H, $R^1$ = $R^2$ = $SO_3Na$
IIId; R = Me, $R^1$ = H, $R^2$ = $SO_3Na$
IIIe; R = H, $R^1$ = H, $R^2$ = $SO_3Na$

Benzopyranobenzimidazopyridine Dye (IIIa)

A mixture of coumarin (IIa) (2.0 g, 5.13 mmol) and malononitrile (0.35 g, 5.30 mmol) in 1-butanol was heated at reflux for 4 hours. The mixture was concentrated to ca. 10 ml and left to stand overnight during which time the product crystallised out as a dark red solid. The product was filtered off, washed with butanol and dried (1.97 g, 87%). The dye (IIIa) was purified by recrystallisation from 1-butanol.

$\lambda_{max}$ (DMF) 541 nm.

Fluorescence (DMF) $\lambda_{ex}$ 541 nm; $\lambda_{em}$ 574 nm; Stokes Shift 33 nm.

FAB-MS m/z; found 440 (MH$^+$); [theoretical ($C_{25}H_{21}N_5O_3$) 439].

$^1$H NMR (300 MHz, $d_6$DMSO) 1.16 (t, 3H, J=6.6 Hz), 2.68 (t, 2H), 3.56 (q, 2H), 3.61 (s, 3H), 3.74 (t, 2H), 6.78 (s,

1H), 6.92 (d, 1H, J=6.9 Hz), 7.37 (m, 2H, J=7.4 Hz), 7.72 (d, 2H, J=8.1 Hz), 8.64 (d, 1H, J=7.2 Hz), 8.68 (s, 1H).

Functionalised Benzopyranobenzimidazopyridine Dye (IIIb)

Imino benzopyranobenzimidazopyridine (IIIa) (200 mg, 0.45 mmol) was heated in a mixture of water (20 ml) and 10N hydrochloric acid (2 ml) at 100° C. for 2 hours. The solution was then cooled and the pH adjusted to 5 with the addition of potassium hydroxide solution. The water was removed under reduced pressure and the product washed with methanol, water and then dried. The product (IIIb) was obtained as a purple solid (67 mg, 35%).

$\lambda_{max}$ (DMF) 545 nm.

Fluorescence (DMF) $\lambda_{ex}$ 545 nm; $\lambda_{em}$ 578 nm; Stokes Shift 33 nm.

$^1$H NMR (300 MHz, d$_6$DMSO) 1.16 (t, 3H), 2.63 (t, 2H), 3.56 (q, 2H), 3.74 (t, 2H), 6.97 (s, 1H), 7.14 (d, 1H), 7.41 (m, 2H), 7.74 (d, 2H), 8.66 (d, 1H), 8.71 (s, 1H).

Sulphonated, Functionalised Benzopyranobenzimidazopyridine Dye (IIIc)

Benzopyranobenzimidazopyridine dye (IIIb) (1 g) was stirred in 25% oleum at room temperature for 3 hours, and the solution was poured onto ice and neutralised with NaOH. The solution was evaporated to dryness and a portion of the sodium sulphate/dye mixture (6.5 g) was taken and stirred in water (50 ml) at room temperature for 30 minutes and then centrifuged. The supernatant was discarded and the washing process repeated with a small amount of water. The resultant solid (60 mg) was dried in a vacuum desiccator. This showed a single red fluorescent spot on t.l.c.

$\lambda_{max}$ (H$_2$O) 536 nm.

Fluorescence (H$_2$O) $\lambda_{ex}$ 536 nm; $\lambda_{em}$ 564 nm; Stokes Shift 28 nm. Electrospray (–ve ion)-MS m/z; found 584; [theoretical (C$_{24}$H$_{16}$N$_4$S$_2$O$_{10}$) 584].

Using milder sulphonation conditions and purification of the product by HPLC (RP C$_{18}$, 33% methanol in water), both the methyl ester (IIId) and the free acid (IIIe) forms of the monosulphonated benzopyranobenzimidazopyridine dye were also isolated.

(IIId)—Methyl ester

MALDI-TOF-MS m/z; found 519 (M$^+$); [theoretical (C$_{25}$H$_{20}$N$_4$SO$_7$) 520].

$^1$H NMR (300 MHz, d$_6$DMSO), 1.17 (t, 3H, J=6.9 Hz), 2.71 (t, 2H), 3.37 (q, 2H), 3.63 (s, 3H), 3.80 (t, 2H), 6.78 (s, 1H), 7.03 (d, 1H, J=7.2 Hz), 7.63 (d, 1H, J=8.4 Hz), 7.71 (d,1H, J=8.4 Hz), 7.84 (d, 1H), 8.85 (s, 1H), 8.97 (s, 1H).

(IIIe)—Free acid

MALDI-TOF-MS m/z; found 504 (M$^+$); [theoretical (C$_{24}$H$_{17}$N$_4$SO$_7$) 505].

$^1$H NMR (300 MHz, d$_6$DMSO), 1.17 (t, 3H), 2.27 (t, 2H), 3.63 (m, 4H), 6.67 (s, 1H), 7.02 (d,1H), 7.62 (d,1H, J=8.4 Hz), 7.70 (d, 1H, J=8.4 Hz), 7.80 (d, 1H, J=9.6 Hz), 8.81 (s, 1H), 8.96 (s, 1H).

EXAMPLE 12

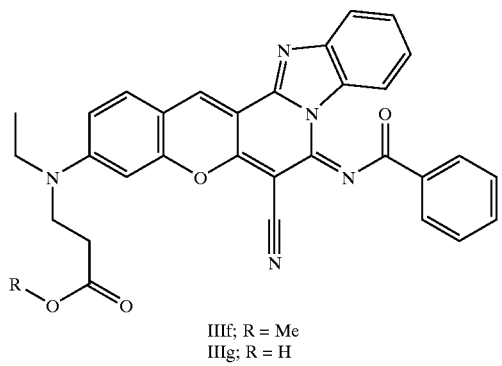

IIIf; R = Me
IIIg; R = H

N-Benzoylimino Benzopyranobenzimidazopyridine (IIIf)

Imino benzopyranobenzimidazopyridine dye (IIIa) (200 mg, 0.46 mmol) and benzoyl chloride (1 g, 7.12 mmol) in pyridine (10 ml) were heated at 80° C. overnight. The resultant mixture was poured into water (200 ml) and stirred at room temperature for 1 hr and then extracted with dichloromethane. The organic phase was washed with 10% sodium bicarbonate and concentrated in vacuo. Purification of the residue by flash column chromatography (Silica: dichloromethane to 20% acetone/dichloromethane) afforded the desired product. The product (IIIf) was obtained as a dark red solid (180 mg, 73%).

$\lambda_{max}$ (DMF) 559nm.

Fluorescence (DMF) $\lambda_{ex}$ 559nm; $\lambda_{em}$ 596 nm; Stokes Shift 37 nm.

FAB-MS m/z; found 566 (MNa+), 543 (M$^+$); [theoretical (C$_{32}$H$_{25}$N$_4$O$_4$) 543].

N-Benzoylimino Benzopyranobenzimidazopyridine (IIIg)

Hydrolysis of dye (IIIf) under acidic conditions (dilute hydrochloric acid, 90° C., 2 h) afforded the free carboxylic acid containing N-benzoylimino-benzopyranobenzimidazopyridine dye (IIIg).

$\lambda_{max}$ (DMF) 552 nm.

Fluorescence (DMF) $\lambda_{ex}$ 552 nm; $\lambda_{em}$ 580 nm; Stokes Shift 28 nm.

FAB-MS m/z; found 530 (MH$^+$); [theoretical (C$_{31}$H$_{23}$N$_5$O$_4$) 529].

Example of Red-fluorescent Rhodamine Dyes (IV)—Application 4

EXAMPLE 13.

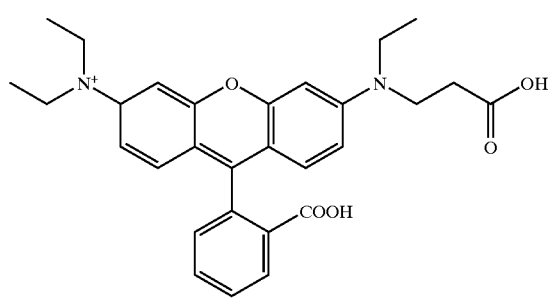

Monofunctionalised Rhodamine Dye (IVa)

3-N-Ethyl-N-(2'methoxycarbonylethyl)-aminophenol (Ia) (0.88 g, 4 mmol), 2-(4'-N,N-diethylamino-2'-hydroxybenzoyl)benzoic acid (1.13 g, 4 mmol) and concentrated sulphuric acid (15 ml) were stirred together at room temperature for 24 hrs. The reaction mixture was then slowly neutralised with sodium hydroxide solution (20%) until the rhodamine dye started to crystallise out of solution. The dye was filtered off and dried. The dye was purified by column chromatography (silica; 1:1 chloroform/methanol, finally dissolving dye in chloroform and filtering to remove the silica). The product (IVa) was obtained as a magenta powder (0.02 g, 1%).

$\lambda_{max}$ (MeOH) 544 nm.

Fluorescence (MeOH) $\lambda_{ex}$ 547 nm; $\lambda_{em}$ 570 nm; Stokes Shift 23 nm.

FAB-MS; found 487; [theoretical ($C_{29}H_{31}N_2O_5$) 487].

$^1$H NMR (300 MHz, CD$_3$OD) 1.28 (t, 9H, J=6.0 Hz), 2.53 (t, 1H, J=7.2 Hz), 3.66 (m, 6H, J=7.5 Hz), 3.84 (t, 1H, J7.5 Hz), 7.00 (m, 4H), 7.26 (m, 3H), 7.62 (m, 2H), 8.08 (d, 1H, J=4.5 Hz).

Examples of pH, Sensitive Photochromic Dyes (VI) and Basic Dye Forms (VII)—Application 6

EXAMPLE 14

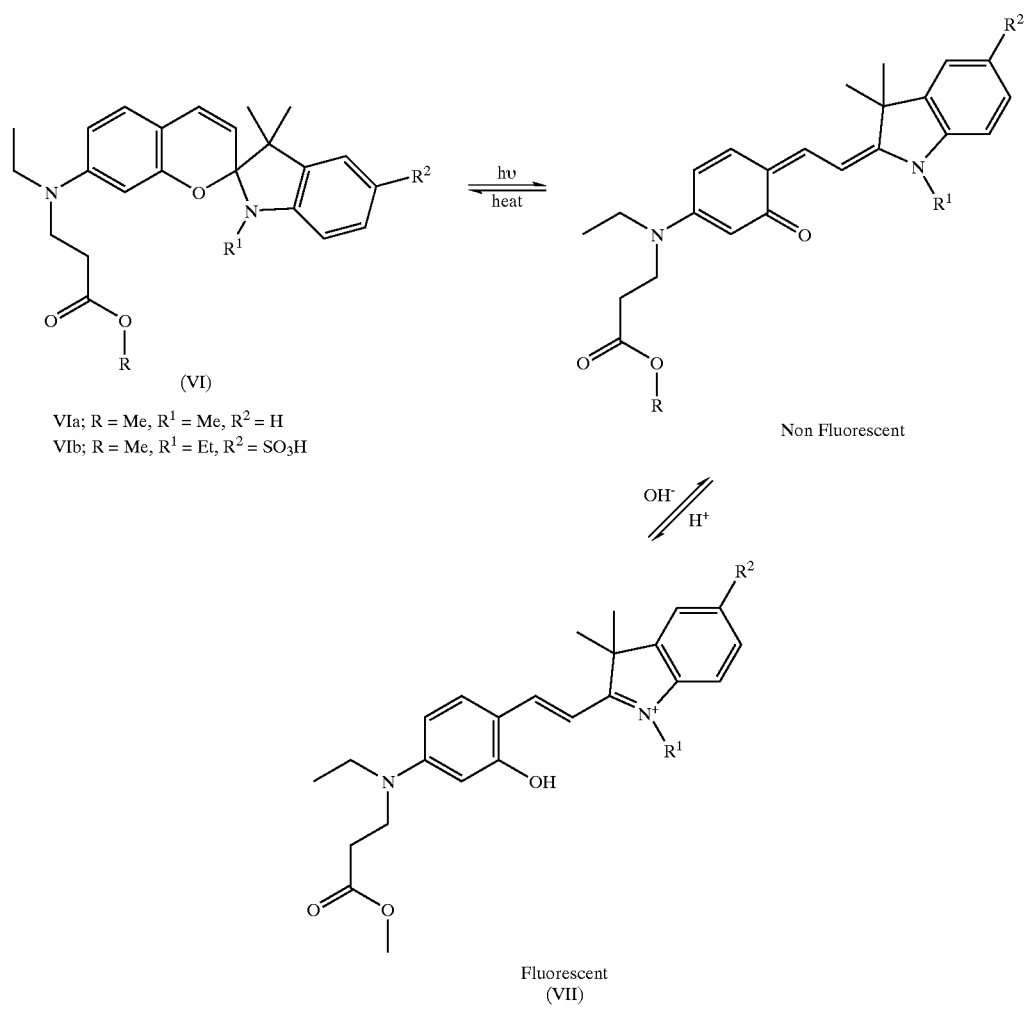

VIa; R = Me, R$^1$ = Me, R$^2$ = H
VIb; R = Me, R$^1$ = Et, R$^2$ = SO$_3$H

Non Fluorescent

Fluorescent (VII)

VIIa; R = Me, R$^1$ = Me, R$^2$ = H
VIIb; R = Me, R$^1$ = Et, R$^2$ = SO$_3$H 4-(N-ethyl-N-(2'methoxycarbonylethyl)-amino) benzaldehyde (1 g, 0.40 mmol), Fischer's base (0.6 g, 0.40 mmol), triethylamine (0.5 ml) and ethanol (10 ml) were heated together at reflux for 4 hours. On cooling the product crystallised out of solution and was filtered off, washed with methanol and dried. The product was isolated in the colourless spiro form (VIa) (0.7 g, 50%). It was noted that the non-fluorescent merocyanine form (VIa open) could be switched to the fluorescent basic dye form (VIIa) by adding acid to a solution of dye in methanol.

Merocyanine Form (VIa)

$\lambda_{max}$ (MeOH) 550 nm, $E_{max}$ 37,677 l.mol$^{-1}$.cm$^{-1}$.

Fluorescence (MeOH) $\lambda_{ex}$ 563 nm; $\lambda_{em}$ 574 nm; Stokes Shift 11 nm,—negligible fluorescence.

Basic Form (VIIa)

$\lambda_{max}$ (MeOH) 544 nm, $E_{max}$ 71,968 l.mol$^{-1}$ .cm$^{-1}$.

Fluorescence (MeOH) $\lambda_{ex}$ 569 nm; $\lambda_{em}$ 581 nm; Stokes Shift 12 nm, $^1$H NMR Basic dye (VIIa), (300 MHz, CD$_3$OD), 1.24 (t, 3H, J6.9 Hz), 1.76 (s, 6H), 2.70 (t, 2H, J=7.2 Hz), 3.56 (q, 2H, J=6.9 Hz), 3.69 (s, 3H), 3.78 (t, 2H, J=6.9 Hz), 3.83 (s, 3H), 6.18 (s, 1H), 6.52 (d, 1H, J=9.3 Hz.), 7.17 (broad d) 7.41 (m, 4H), 7.81 (d, 1H, J=9.9 Hz), 8.57 (d, 1H, J=14.7 Hz).

Photochromic Dye (VIb)

2-Acetoxy-4-(N-ethyl-N-(2'methoxycarbonylethyl)-amino)-benzaldehyde (Ie) (0.5 g, 1.7 mmol), 1-ethyl-2,3,3-trimethyl-indolium-5-sulphonate (0.46 g, 1.7 mmol), triethylamine (0.25 ml) and ethanol (10 ml) were heated at reflux for 5 hours. On cooling the ethanol was removed under reduced pressure to leave a magenta tar which was triturated with ether to give a sticky magenta solid. The dye was purified by column chromatography (silica; 30% methanol in ethyl acetate). The product (VIb) was obtained as a purple solid (0.11 g, 11.4%). In order to convert dye (VIb) to the basic dye form (VIIb) a small sample of the dye was dissolved in methanol containing hydrochloric acid. The dye was then reprecipitated by adding ether, filtered off and dried.

(VIIb) $\lambda_{max}$ (MeOH) 554 nm.

Fluorescence (VIIb) (MeOH) $\lambda_{ex}$ 544 nm; $\lambda_{em}$ 577 nm;

Stokes Shift 33 nm.

$^1$H NMR (VIb) (300 MHz d$_6$DMSO), 1.14 (broad, 3H), 1.34 (broad, 3H), 1.69 (s, 6H), 2.67 (broad, 2H), 3.48 (broad, 2H), 3.62 (s, 3H), 3.70 (broad, 2H), 4.38 (broad), 6.29, (s, 1H), 6.53 (d, 1H,), 7.23 (d, 1H7.59 (d, 1H), 7.71 (d, 1H), 7.90 (s, 1H,), 8.01 (d, 1H), 8.41 (d, 1H).

Example of pH Sensitive Green-Black Floran Dye (XIII)—Application 7

EXAMPLE 15

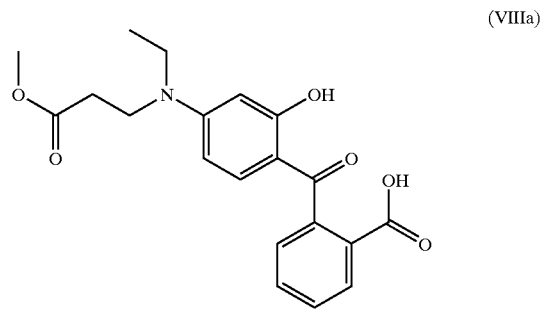
(VIIIa)

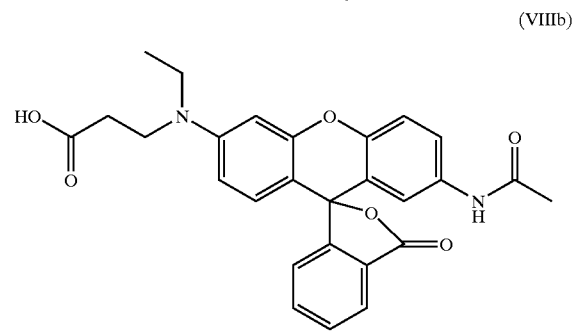
(VIIIb)

Green-Black Floran Dye (VIIIb)

Phthalic anhydride (2.66 g, 0.018 mol) was added to a stirred solution of 3-N-ethyl-N-(2'methoxycarbonylethyl)-aminophenol (Ia) (4 g, 0.018 mol) in 5 ml chlorobenzene, the resulting solution was then heated at 100° C. for 8 hours. The chlorobenzene solvent was removed on a rotary evaporator yielding a red tar, which TLC showed to contain significant quantities of unreacted material (yield 6.57 g). This was purified by dissolving the solid in a dilute solution of sodium hydroxide, followed by extraction with dichloromethane. The product remained in the aqueous phase and was then extracted into dichloromethane after acidifiying the solution. Evaporation of the solvent gave (VIIIa) (1.2 g; 18%).

Intermediate (VIIa) (0.3 g, 1.1 mmol) was dissolved in conc. H$_2$SO$_4$ (4 ml) and 3-dimethylaminophenol (0.15 g, 1.1 mmol) was added in portions over 15 minutes. The solution was then stirred at room temperature for 65 hours. TLC analysis of the solution showed it to contain 3 components.

The acidic solution (~3 ml) was poured onto a 20 g water/ice mixture and slowly neutralised with concentrated sodium hydroxide, and the resultant fluoran lactone species was extracted at ~pH 6 into 2×100 ml portions of dichloromethane. The extracts were dried and evaporated under reduced pressure. This gave (VIIIb) in 1% yield. The visible absorption spectrum of the dye showed $\lambda_{max}$=530 nm under acid condition, the peak disappearing (reversibly) under basic conditions due to lactone formation.

The mass spectrum of the product was consistent with the assigned structure (FAB: found m/Z=473, with weaker peak at m/Z=495; C$_{27}$H$_{24}$N$_2$O$_6$ requires M+1=473, M+23=495).

Example of Styryl hemi-Cyanines (IX)—Application 8

EXAMPLE 16

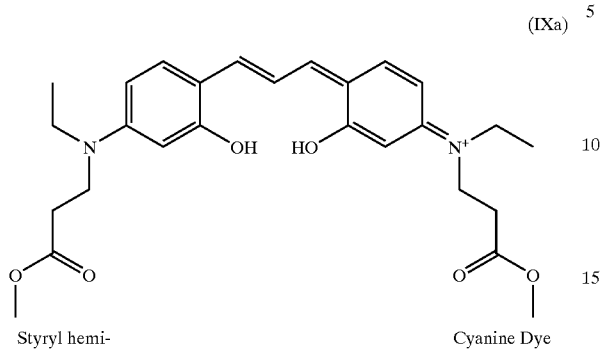

Styryl hemi- Cyanine Dye

3-Anilinoacrylaldehyde anil (0.25 g, 1.1 mmol) and acetic anhydride (1 ml) were heated together at 40° C. for 30 mins. 3-N-Ethyl-N-(2'methoxycarbonylethyl)-aminophenol (Ia) (0.5 g, 2.3 mmol) and acetic acid (5 ml) were then added and the mixture was warmed to 40° C. and stirred for 1 hr. On cooling ether (100 ml) was added and the solvents were then decanted off to leave a cyan coloured tar.

$\lambda_{max}$ (MeOH) 660 nm.

Electrospray-MS (+ve ion); found 483 ($M^+$); [theoretical ($C_{27}H_{35}N_2O_6$) 484].

Examples of Leuco Dyes for Use as Enzyme Substrates—Application 9

EXAMPLE 17

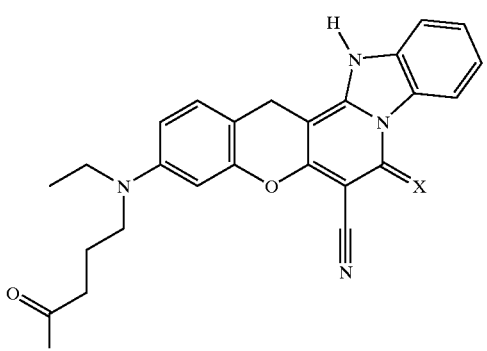

a; R = $CH_3$, X = NH
b; R = H, X = O

Benzopyranobenzimidazopyridine Leuco Dye (a)

Sodium borohydride (excess) was added to a solution of benzopyranobenzimidazopyridine dye (IIIa) (0.5 g) in dichloromethane/methanol (60/10 ml). After 10 mins, water (50 ml) and 10N hydrochloric acid (1 drop) was added and the mixture was stirred for a further 10 mins in order to destroy the excess sodium borohydride. The pale yellow solid (a) which formed was filtered off and dried overnight in vacuo.

Benzopyranobenzimidazopyridine Leuco Dye (b)

Sodium borohydride (at least 5 fold excess) was added to a solution of the benzopyranobenzimidazopyridine dye (IIIb) (1 g) in methanol (100 ml). After the effervescence had ceased (ca. 10 min) the solution was concentrated in vacuo and then dried overnight in vacuo to afford the crude leuco dye (b), 1.35 g.

In both of the above cases treatment of a solution of the leuco dye in DMF with a solution of chloranil in DMF regenerated the colour (and hence the absorption spectrum) of the parent dye.

Examples of squarylium (XI)—Application 11

EXAMPLE 18

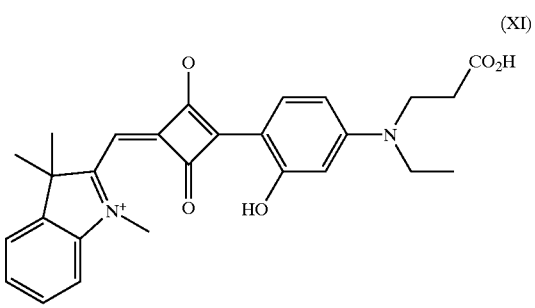

Unsymmetrical squarylium dye (XI)

Dimethyl squarate (0.50 g) and Fischer's base (0.61) were dissolved in methanol (15 ml) containing sodium methoxide (0.3 g) and the solution stirred at 30° C. for 5 hours. To the solution was added n-butanol (40 ml), toluene (20 ml), 3-N-ethyl-N-(2'methoxycarbonylethyl)-aminophenol (Ia) (0.79 g) and 5 drops of concentrated hydrochloric acid, and the mixture heated under reflux for 4 hours. The solvent was then removed under reduced pressure and the residue chromatographed over silica gel using dichloromethane with increasing proportions of acetone as eluent. When the first blue band had been eluted the second blue band was eluted with methanol, affording, after evaporation of the solvent, dye (XI) (0.45 g), which was characterised by mass spectrometry.

$\lambda_{max}$ (MeOH) 628 nm.

Fluorescence (MeOH) $\lambda_{ex}$ 628 nm; $\lambda_{em}$ 648 nm; Stokes Shift 18 nm.

What is claimed is:

1. A dye having the formula

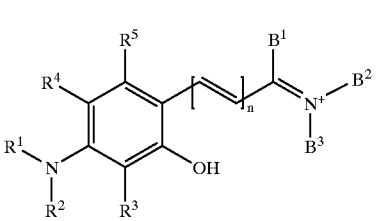

wherein n represents 0, 1 or 2, $B^1$ represents H, or represents $C_1$-$C_{10}$ alkyl, aryl or aralkyl, each of which is either unsubstituted or substituted by
 a group to modify solubility, or
 a group to modify electronic and/or spectral properties,
 or a functional linking group, or Cl, Br or F, $B^2$ and $B^3$ independently represent $C_1$–$C_{10}$ alkyl, aryl or aralkyl, each of which is either unsubstituted or substituted by
- a group to modify solubility, or
- a group to modify electronic and/or spectral properties, or
- a functional linking group, $B^1$ and $B^2$ and/or $B^1$ and $B^3$ may be linked to form a one or two fused ring system, each ring containing 5 or 6 atoms, which is carbocyclic or heterocyclic,
- wherein said system can be either aromatic or aliphatic which is unsubstituted or substituted by
  - a group to modify solubility, or
  - a group to modify electronic and/or spectral properties, or
  - a functional linking group;

$R^1$ represents —$R^aR^b$, where
- $R^a$ is $C_1$–$C_{10}$ alkylene or aralkylene which may optionally contain 1 to 4 oxygen, nitrogen or sulphur atoms in a straight or branched chain, and
- $R^b$ is carboxy, $R^2$, $R^3$, $R^4$ and $R^5$ independently represent H; or $C_1$–$C_{10}$ alkyl or aralkyl
which may optionally contain 1 to 4 oxygen, nitrogen or sulphur atoms in a straight or branched chain; or $R^c$ where
- $R^c$ is a group to modify solubility, or
- a group to modify electronic and/or spectral properties, or
- a functional linking group; or —$R^aR^c$ wherein $R^a$ and $R^c$ are herein defined as above, or $R^4$—$R^5$ or $R^2$—$R^4$ or $R^2$–$R^3$ are linked to form a single six membered ring system, which is carbocyclic or heterocyclic,
- wherein said system can be either aromatic or aliphatic which is unsubstituted or substituted by
  - a group to modify solubility, or
  - a group to modify electronic and/or spectral properties, or
  - a functional linking group.

2. The dye of claim 1 which is in a merocyanine non-fluorescent form or in a basic fluorescent form.

3. A leuco-dye or reduced dye analogue of the dye as claimed in claim 1.

4. A complex of a dye according to claim 1 with a biomolecule, wherein the compound is covalently linked to the biomolecule through $R^1$.

5. The dye of claim 1 wherein said carboxy representing $R^b$ is selected from the group consisting of acid, salt, ester, N-hydroxysuccinimide, activated ester and amide.

* * * * *